United States Patent [19]
Chelberg et al.

[11] 4,084,236
[45] Apr. 11, 1978

[54] ERROR DETECTION AND CORRECTION CAPABILITY FOR A MEMORY SYSTEM

[75] Inventors: Lawrence W. Chelberg; James L. King, both of Phoenix, Ariz.

[73] Assignee: Honeywell Information Systems Inc., Waltham, Mass.

[21] Appl. No.: 770,132

[22] Filed: Feb. 18, 1977

[51] Int. Cl.² ............................................ G06F 11/00
[52] U.S. Cl. ................................................. 364/200

[56] References Cited

U.S. PATENT DOCUMENTS

| | | | |
|---|---|---|---|
| 3,588,829 | 6/1971 | Boland et al. | 364/200 |
| 3,588,839 | 6/1971 | Belady et al. | 364/200 |
| 3,618,040 | 11/1971 | Iwamoto et al. | 364/200 |
| 3,668,644 | 6/1972 | Looschen | 364/200 |
| 3,820,078 | 6/1974 | Curley et al. | 364/200 |
| 3,866,183 | 2/1975 | Lange | 364/200 |
| 3,896,419 | 7/1975 | Lange et al. | 364/200 |
| 3,938,097 | 2/1976 | Niguette, III | 364/200 |
| 3,949,369 | 5/1976 | Churchill, Jr. | 364/200 |

*Primary Examiner*—Gareth D. Shaw
*Assistant Examiner*—Thomas M. Heckler
*Attorney, Agent, or Firm*—Faith F. Driscoll; Nicholas Prasinos; Ronald T. Reiling

[57] ABSTRACT

A memory system includes a cache store and a backing store. The cache store provides fast access to blocks of information previously fetched from the backing store in response to commands. The backing store includes error detection and correction apparatus for detecting and correcting errors in the information read from backing store during a backing store cycle of operation. The cache store includes parity generation circuits which generate check bits for the addresses to be written into a directory associated therewith. Additionally, the cache store includes parity check circuits for detecting errors in the addresses and information read from the cache store during a read cycle of operation. The memory system further includes control apparatus for enabling for operation, the backing store and cache store in response to the commands. The control apparatus includes circuits which couples to the parity check circuits. Such circuits are operative upon detecting an error in either an address or information read from the cache store to simulate a condition that the information requested was not stored in cache store. This causes the control apparatus to initiate a backing store cycle of operation for read out of a correct version of the requested information thereby eliminating the necessity of including in cache store more complex detection and correction circuits.

27 Claims, 16 Drawing Figures

4,084,236

ERROR DETECTION AND CORRECTION CAPABILITY FOR A MEMORY SYSTEM

RELATED APPLICATIONS

1. "Input/Output Cache System Including Bypass Capability" invented by Jaime Calle and Lawrence W. Chelberg, Ser. No. 755,871, filed on Dec. 30, 1976 and assigned to the same assignee as named herein.
2. "Memory Access System" invented by Edward F. Weller, III and Marion G. Porter, Ser. No. 742,814, filed on Nov. 18, 1976 and assigned to the same assignee as named herein.

BACKGROUND OF THE INVENTION

1. Field of Use

The present invention relates to data processing systems and in particular to memory systems which include cache stores.

2. Prior Art

It is well known that it is important to ensure the validity of information read out from a memory system. In general, the requisite reliability has been achieved by the addition of error correction and detection (EDAC) circuits to such memory systems. In order to provide the same degree of reliability for the cache store when included as part of the memory system, the same type circuits are provided.

It has been found that the major disadvantage of such arrangements is the added complexity to the cache store resulting from the inclusion of such circuits. Another important disadvantage is the additional time to each cache store cycle to provide for detection and correction of errors in the information read out from the cache store.

Accordingly, it is a primary object of the present invention to provide an improved arrangement for detecting and correcting errors in a cache type memory system.

It is a further object of the present invention to provide a cache type memory system which requires a minimal amount of error and detection circuits for ensuring reliable operation.

SUMMARY OF THE INVENTION

The above and other objects are achieved in a preferred embodiment of the present invention which comprises a memory system including a backing store and a cache store. The cache store provides fast access to blocks of information previously fetched from the backing store.

The backing store includes error detection and correction (EDAC) apparatus for detecting and correcting errors in the information being written into the backing store during a backing store cycle of operation. The cache store includes parity generation circuits which generate check bits for addresses being written into the directory associated therewith.

Additionally, the cache store includes parity check circuits for detecting errors in the addresses, and information requested to be read from the directory and the cache store during a read cycle of operation. The memory system further includes control apparatus for enabling for operation the backing store and cache store in response to commands. The control apparatus includes circuits which couple to the parity check circuits. These circuits are operative, upon detecting an error in either the address or information read from the directory or cache store during a read cycle of operation, to generate signals which simulate a condition that the requested information was determined not to be stored in cache store although it was stored and read out. The control apparatus in response to such signals is operative to initiate a backing store cycle of operation for read out of a correct version of the actual requested information. By providing a check on the address directory, this ensures that the wrong information is not read out.

The arrangement of the present invention therefore eliminates the necessity of having to include more complex detection and correction circuits in the memory system. By utilizing the signals indicative of error conditions in the address and information read out from the directory and cache store respectively to simulate the condition that the information is not stored in the cache store, this results in a minimization of the amount of additional circuits required and the number of modifications required to be made to the remainder of the system.

Additionally, during the backing store cycle the correct version of information read out from the backing store will be written into the cache store when the memory command coded to so specify. This arrangement is subject of patent application of Jaime Calle, et al entitled, "Input/Output Cache System Including Bypass Capability." It will be appreciated that in such cases, the cache store information will be corrected automatically thereby increasing the reliability of the memory system in recovering from transit intermittent or socalled soft failure conditions.

The arrangement of the present invention takes advantage of the fact that the error rate of a low capacity memory such as a cache store is low, the normally fast access time of the cache store is maintained. That is, the parity generation and check circuits require a minimal amount of time for the performance of the required checking operations. Hence, no additional time must be alloted resulting in a lengthening of the access time.

It will be appreciated that with the reduction in the circuit complexity, the same degree of reliability is retained through a sharing of the highly reliable EDAC circuits of the backing store. Moreover, since the error rate of the cache store is extremely low, the added time in accessing the correct information from backing store is minimal.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

DESCRIPTION OF THE PREFERRED EMBODIMENT

General Description

Figure 1:
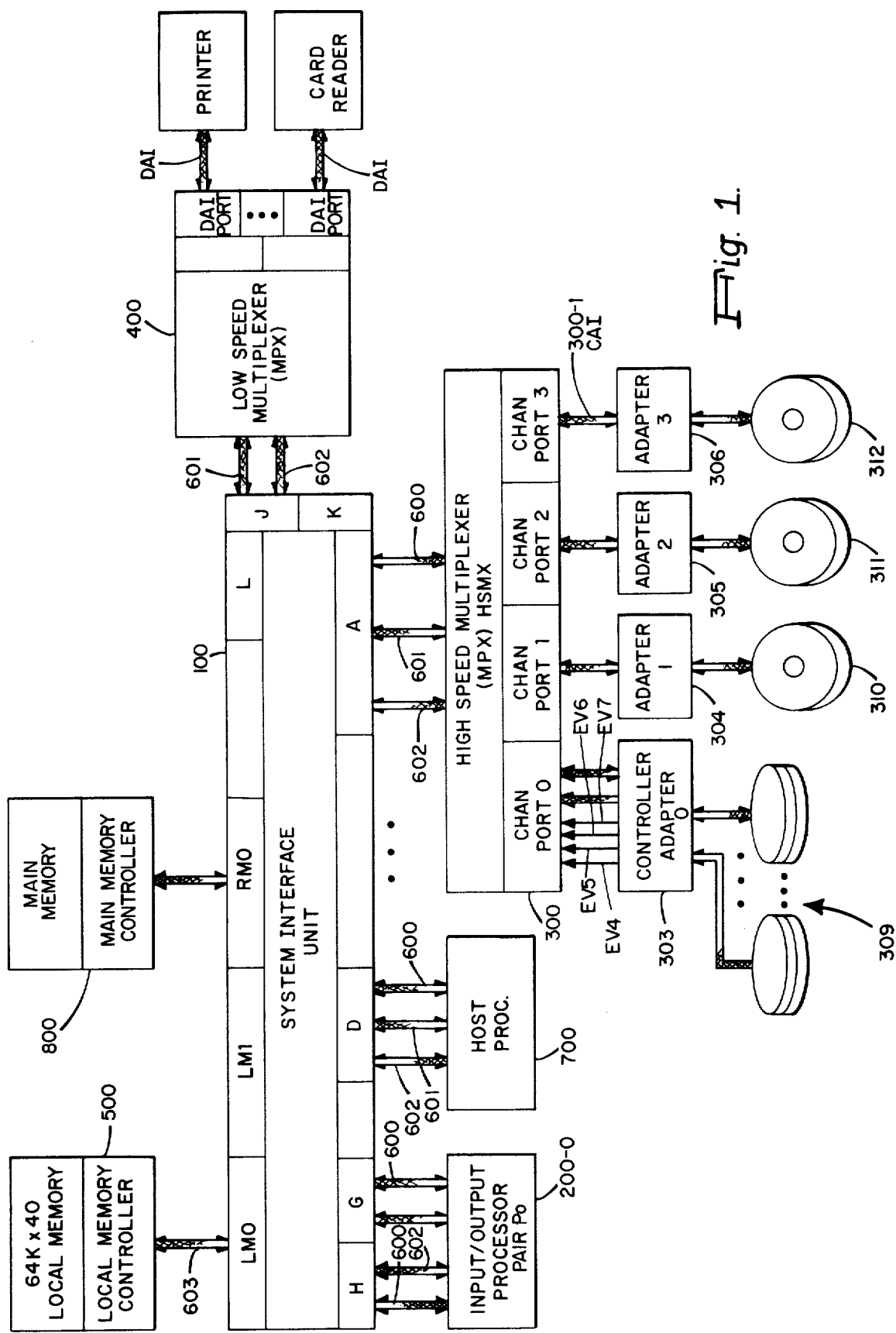
FIG. 1 illustrates in block diagram form an input/output system employing the memory system of the present invention.

As seen from FIG. 1, the system which incorporates the principles of the present invention includes at least one input/output processor pair (PO) 200-0, a system interface unit (SIU) 100, a high speed multiplexer (HSMX) 300, a low speed multiplexer (LSMX) 400, a host processor 700 and a number of memory modules corresponding to a local memory module 500 and main memory module 800. Different ones of these modules connect to one of a number of ports of the system interface unit 100 through a plurality of lines of different ones of different types of interfaces 600 through 603. More specifically, the input/output processor 200, the host processor 700 and high speed multiplexer 300 connect to ports G, E and A respectively while the low speed multiplexer 400 and memory modules 500, 500a and 800 connect to ports J, LMO and RMO respectively.

The input/output system of FIG. 1 can be viewed as including a number of "active modules," "passive modules" and "memory modules." The IOP processor 200, host processor 700 and high speed multiplexer 300 serve as active modules in that each have the ability to issue commands. The active modules normally connect to ports A through H. A plurality of passive modules are connected to three ports J, K and L. These modules correspond to the low speed multiplexer 400 and the system interface unit 100 and are units capable of interpreting and executing commands applied to the lines of interface 601 as described herein. The last group of modules constitute local memory modules and remote memory modules such as those of the main system which are capable of executing two different types of commands applied to the lines of interface 603.

The input/output system of FIG. 1 normally functions as an input/output subsystem responsive to input/output instructions issued by host processor 700 which normally connects to port F via the interfaces 600 and 601 which correspond to a data interface and a programmable interface respectively described in greater detail herein. Ports F and E include interfaces for enabling connection of either multiplexer or processor modules of FIG. 1.

For the purpose of the present invention, processor 700 is conventional in design and may take the form of those units described in U.S. Pat. No. 3,413,613. In the preferred embodiment, the input/output processor 200 initiates and terminates channel programs required for the execution of input/output instructions, processes interrupt requests received from the system interface unit 100 and directly controls unit record peripheral devices coupled to low speed multiplexer 400. The processor 200 connects to port H via the data interface 600 and interrupt interface 602.

The low speed multiplexer 400 which for the purposes of the present invention can be considered conventional in design, provides for attachment of low speed peripheral devices via peripheral adapters, each of which couple to the lines of a device adapter interface (DAI). The interface and adapter may take the form of those units described in U.S. Pat. No. 3,742,457 which is assigned to the assignee of the present invention. The low speed devices include card readers, card punches and printers. As seen from FIG. 1, the multiplexer 400 connects to port J via the programmable interface 601.

The high speed multiplexer 300 directly controls transfers between the groups of disk devices and tape devices 309 through 312 which connect to different ones of the channel adapters 302 to 305. Each of the channel controller adapters 303 through 306 which can to a maximum of 16 devices, in turn connects to a different one of the ports or channels 0 through 3 via the interface lines of a channel adapter interface (CAI) 301-1. The high speed multiplexer 300 connects to port A corresponding to a data interface 600, a programmable interface 601 and an interrupt interface 602.

For purposes of the present invention, each of the channel controller adapters 302 through 305 may be considered conventional in design and take the form of controller adapters described in the aforementioned U.S. Pat. No. 3,742,457.

As mentioned previously, each of the modules connect to different ports of the system interface unit 100. The unit 100 controls the connection of the different modules to each other via transfer paths enabling the transfer of data and control information between pairs of modules. For the purposes of the present invention, the system interface unit 100 can be viewed as a switching network enabling each of the "active" modules to transfer data to and from local memory module 500 when the requesting module has the highest priority and is granted the next available memory cycle. That is, as explained herein, the unit 100 includes priority logic circuits which determine the relative priority of requests from each of the active modules and grants the next available memory cycle to the highest priority request received.

Additionally, the unit 100 includes interrupt priority logic circuits which determine the relative priority of interrupt requests received from each of the modules and selects the highest priority request received and passes the request to processor 200 via a switching network as explained herein.

The Port Interfaces

Before describing in greater detail different one of the modules of FIG. 1, each of the interfaces 600 through 603 referred to previously will now be described with reference to FIGS. 5a through 5d.

Figures 5A, 5B, 5C, 5D:
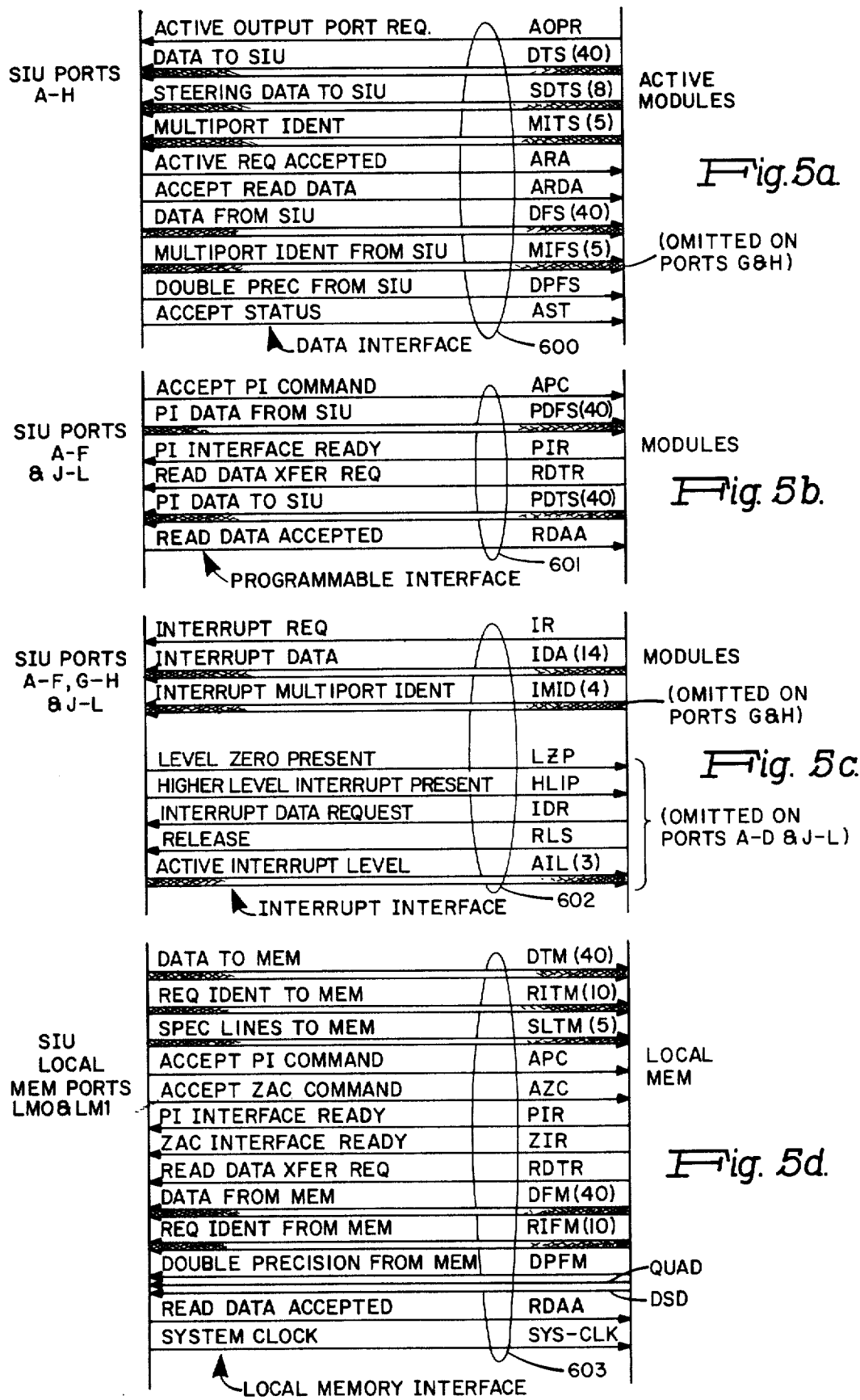
FIGS. 5a through 5d show the various interfaces of FIG. 1.

Referring first to FIG. 5a, it is seen that this figure discloses the lines which constitute the data interface which is one of the interfaces which provides for exchange of information between an active module and the system interface unit 100. Exchange is accomplished by controlling the logical states of various signal lines in accordance with pre-established rules implemented through a sequence of signals termed a "dialog."

As seen from FIG. 5a, the interface includes an active output port request line (AOPR), a plurality of data to SIU lines (DTS 00-DTS 35, P0-P3), a plurality of steering data to SIU lines (SDTS 0-6, P), a plurality of multiport identified to SIU lines (MITS 0-3, P), an active request accepted line (ARA), an accept read data line (ARDA), a plurality of data from SIU bus lines (DFS 00-35, P0-P3), a plurality of multiport identifier from SIU lines (MIFS 0-3, P), a double precision from SIU line (DPFS), and an accept status line (AST). The description of the interface lines are given in greater detail in the section to follow.

| DATA INTERFACE LINES | |
|---|---|
| Designation | Description |
| AOPR | The active output port request line is an unidirectional line which extends from each of the active modules to the SIU 100. When set, this line signals the SIU that the module request a transfer path over which a command or data are to be transmitted. |
| DTS 00-35, P0-P3 | The data path lines are a four byte wide unidirectional path (four 10 bit bytes) that extends between each of the active modules and the SIU and are used for transferring commands or data from each active module to the SIU 100. |
| SDTS 0-6, P | The steering data to SIU lines extend from each active module to the SIU 100. These lines are used to apply steering control information to the SIU 100 when the line AOPR is set. Steering control information consists of seven bits and a parity bit which are coded as follows. (a) The state of bit 0 - The type of command applied to the DTS lines (whether the command is a programmable interface command or a memory command). (b) Bits 1-4 are coded to indicate which one of the modules are to receive and interpret the command (commands are interpreted only by memory modules and programmable interface commands shall be interpreted by all modules except input/output processor 200). (c) The state of bit 5 indicates whether one or two words of the command information is to be transferred between the requesting active module and the designated receiving module (one word specifies a single precision transfer and two words specifies a double precision transfer). (d) The state of bit 6 indicates the direction of transfer between the requesting module and the designated receiver module. (e) Bit P is a parity bit generated by the requesting active module which is checked by apparatus included within the SIU 100. |
| MITS 0-3, P | The four multiport identifier to SIU lines extend from active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the module to remove the requested information from the data interface lines. |
| ARDA | The accept read data line extends from the SIU to each of the active modules. This line is set by the SIU 100 to indicate to the active module that it is to accept the previously requested data from a designated module. |
| DFS 00-35, P0-P3 | The data from SIU lines are another set of data path lines which are a four byte wide unidirectional path (four 10 bit bytes) which extends from the SIU to each active module. These set of lines are used by the SIU 100 to convey read type data to a designated one of the active modules. |
| MIFS 0-3, P | The four multiport identifier lines plus odd parity line extend from the SIU 100 to each of the active modules. |

-continued

| DATA INTERFACE LINES | |
|---|---|
| Designation | Description |
| DPFS | These lines are coded to indicate which port or subchannel on the active module is to accept the data of a previous read operation from the SIU 100. The double precision from SIU line extends from the SIU to each of the active modules. The state of this line indicates whether one or two words of read data are to be accepted by the active module to complete a transfer (read command). |
| AST | The accept status line extends from the SIU 100 to each active module. The state of this line which is mutually exclusive of line ARDA signals the active module that is should accept status information applied to the DFS lines. |

The lines of the programmable interface 601 shown in FIG. 5b provide for transfer of command information from an active module and a designated module. The transfer is accomplished by controlling the logic of states of the various signal lines in accordance with pre-established rules implemented through a sequence of signals termed "dialog." The programmable interface includes an accept programmable interface command line (APC), a plurality of programmable interface data from SIU lines (PDFS 00-35, P0-P3), a programmable interface ready line (PIR), a read data transfer request line (RDTR), a plurality of programmable interface data to SIU lines (PDTS 00-35, P0-P3) and a read data accepted line (RDAA). The description of the interface lines are given in greater detail herein.

| PROGRAMMABLE INTERFACE LINES | |
|---|---|
| Designation | Description |
| APC | The accept programmable interface command line extends from the SIU 100 to each receiving module. When set, this line signals the module that command information has been applied to the PDFS lines of the interface by the SIU and is to be accepted by the module. |
| PDFS 00-35, P0-P3 | The programmable interface data from SIU lines are a four byte wide unidirectional path (four 10 bit bytes) that extend from the SIU 100 to each module. These lines apply programmable interface information from the system interface unit to a designated receiving module. |
| PIR | The programmable interface ready line extends from each module to the SIU. When set, this line indicates that the module is ready to accept a command to be applied to line PDFS. |
| PDTS 00-35, P0-P3 | The programmable interface data to the SIU lines are a four byte wide unidirectional path (four 10 bit bytes) that extend from each module to the SIU 100. These lines are used to transfer programmable interface information to the SIU. |
| RDTR | The read data transfer request line extends from each module connected to the programmable interface to the SIU 100. When set, this line indicates that the previously requested read data is available for transfer to a module and has been applied to the lines PDTS by the module. |
| RDAA | The read data accepted line extends from the SIU 100 to each module. When set, the line indicates to the module that the data applied to the lines PDTS has been accepted and that the module may remove the information from these lines. |

A further interface is the interrupt interface 602 of FIG. 5c which provides for interrupt processing by the input/output processor 200. That is, the interface enables the transfer of interrupt information by an active module to the SIU 100 as well as the transfer of interrupt information by the SIU 100 to the input/output processor 200 for processing. Similar to the other interfaces, the transfer of interrupt requests is accomplished by controlling the logical states of the various signal lines in accordance with pre-established rules implemented through a sequence of signals termed "dialog."

The interface includes an interrupt request line (IR), a plurality of interrupt data lines (IDA 00-11, P0-P1) and a plurality of interrupt multiport identifier lines (IMID 00-03) for modules connected to ports A through L. For modules connected to ports G and H, the interrupt interface further includes to a level zero present line (LZP), a higher level interrupt present line (HLIP), an interrupt data request line (IDR), a release line (RLS) and a plurality of active interrupt level lines (AIL0-2). As seen from FIG. 5c, the interrupt interface ports G and H do not include an interrupt multiport identifier line. The description of the interrupt interface lines are given in greater detail herein.

| INTERRUPT INTERFACE LINES | |
|---|---|
| Designation | Description |
| IR | The interrupt request line extends from each module to the SIU 100. When set, this line indicates to the SIU that it requires service. |
| IDA 0-3, P0, IDA 4-11, P1 | The interrupt data lines extend from an active module to the SIU 100. These lines are coded to contain control information required to be transferred to the input/output processor when an interrupt request has been accepted by the processor. These bits are coded as follows: (a) The state of bit 0 specifies to the SIU 100 which of the two processors (i.e. processor number) is to process the interrupt request. (b) Bits 1-3 are coded to indicate the priority or level number of the interrupt request to the SIU 100. (c) Bit P0 is a parity bit for bits 0-3. (d) Bits 4-8 are coded to provide a portion of an address required to be generated by the input/output processor 200 for referencing the correct procedure for processing the interrupt (i.e. an interrupt control block number ICBN). (e) Bit P1 is a parity bit for bits 4-11. |
| IMID 00-03 | The interrupt multiport identifier lines extend from each active module to the SIU 100. These lines are coded to identify which specific subchannel of the active module has requested interrupt service. |
| LZP | The level zero present line extends from the SIU 100 to the input/output processor 200. When set, this line indicates that there is a highest priority (level 0 interrupt) request being directed to the processor 200 by the SIU 100. |
| HLIP | The higher level interrupt present line extends from the SIU to the input/output processor. When set, this line indicates that there is an interrupt request having a higher level or priority than the procedure or process being executed by the processor 200. |
| IDR | The interrupt data request line extends from the input/output processor 200 to the SIU 100. When set, this line indicates that interrupt data is to be sent to the processor on lines DFS by the SIU 100. |
| RLS | The release line extends from the input/output processor 200 to the SIU 100. This line when set indicates that the |

-continued

| INTERRUPT INTERFACE LINES | |
|---|---|
| Designation | Description |
|  | processor 200 has completed execution of the current procedure. |
| AIL 0-2 | The active interrupt level lines extend from the SIU to the input/output processor 200. These lines are coded to designate the interrupt level number of the procedure being executed by the processor 200. |

A last set of interface lines utilized by certain ones of the modules of FIG. 1 corresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed a "dialog." The local memory interface includes a plurality of data to memory lines (DTM 00-35, P0-P3), a plurality of request identifier to memory lines (RITM 0-7, P0-P1), a plurality of specification lines to memory lines (SLTM 0-3, P), an accept PI command line (APC), an accept ZAC command line (AZC), a PI interface ready line (PIR), a ZAC interface ready line (ZIR), a read data transfer request line (RDTR), a plurality of data from memory lines (DFM 00-35, P0-P3, a plurality of request identifier from memory lines (RIFM 0-7, P0-P1), a double precision from memory line (DPFM), a QUAD line, a read data accepted line (RDAA) and a system clock line (SYSCLK).

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines are given in greater detail herein.

| LOCAL MEMORY INTERFACE LINES | |
|---|---|
| Designation | Description |
| DTM 00-35 P0-P3 | The data path lines constitute a four byte wide unidirectional path (36 information lines and four odd parity lines) that extends from the SIU 100 to the local memory 500. These lines are used to transfer memory or programmable interface commands to the local memory 500. |
| RITM 0-3, P-0 RITM 4-7, P1 | The requestor identifier to memory lines constitute two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to memory line and a parity line. The information signals applied to these lines are coded as follows. (a) Bits 0-1 are port number selection bits coded to specify which port or subchannel within the attached module is to receive or interpret the memory command sent to the module. (b) Bit 2 is a read/wirte to memory bit which is included in the steering control information received from the active module which is forwarded by the SIU to the local memory 500 when a new command is sent to the memory by the |

| LOCAL MEMORY INTERFACE LINES | |
|---|---|
| Designation | Description |
| | SIU 100. The state of this bit indicates the direction of data transfer.<br>(c) Bit 3 is a double precision to memory bit coded to specify the amount of data to be transferred. It is also included in the steering control information provided by the active module which is forwarded to the local memory module 500 by the SIU 100 when a new command is sent to the memory module. |
| AZC | The accept ZAC command line extends from the SIU 100 to the local memory module 500. When set, this line signals the local memory module 500 to accept the ZAC command and control information applied to the other lines by the SIU 100. The setting of this interface line is mutually exclusive with the accept PI command interface line. |
| APC | The accept programmable interface command line, as described in connection with the programmable interface, extends from the SIU 100 to the local memory module 500. When set, this line indicates that the command information applied to the lines DTM is to be accepted by the local memory module 500. |
| PIR/<br>ZIR | The programmable interface ready line/ZAC interface ready line extends from the local memory module 500 to the SIU 100. When set, each line signals the SIU 100 that the local memory module 500 is capable of accepting a programmable interface (PI)/memory (ZAC) command. |
| RDTR | The read data transfer request line extends from the local memory module 500 to the SIU 100. This line when set indicates that the read type data previously requested by a ZAC or P1 command is available along with the necessary control information to be sent to the module requesting the data. |
| DFM<br>00–35,<br>P0-P3 | The data from memory lines are a four byte wide unidirectional bus which extends from the local memory module 500 to the SIU 100. These lines are used to return read requested type data to an active module via the SIU 100. |
| RIFM<br>0–3,<br>P0,<br>RIFM<br>4–7,<br>P1 | The two groups of requestor identifier from memory lines extend from the local memory module 500 to the SIU 100. These lines are coded for directing the read data back from module 500 back to the requesting module. |
| DPFM<br>and<br>QUAD | The double precision from memory line and QUAD line extend from the local memory module 500 to the SIU 100. These lines are coded to indicate the number of words to be transferred via the SIU 100 to the requesting module during read data transfer request time interval. These lines are coded as follows<br>QUAD  DPFM<br>0        0       one word single precision<br>0        1       two words, double precision<br>1        X<br>         (don't four words<br>         care) |
| DSD | The read data/status identifier line extends from the local memory module 500 to the SIU. The state of this line signals the SIU 100 whether the information applied to the lines DFM is read data or status information when line RDTR is set. When set, the line indicates status information of one or two words (QUAD=0) is being transferred. When reset to a binary ZERO, the line signals that up to four words of data are being transferred, the number being specified by the coding of lines QUAD and DPFM. |
| RDAA | The read data accepted line as mentioned in connection with programmable terminal extends from the SIU 100 to the local memory module. When set, this line signals the memory module that the data applied on the interface lines by the local memory module has been accepted and that the local memory module may remove data from these lines. |
| SYS-<br>CLK | The system clock line is a line which extends from the SIU 100 to each module of the system. This line is connected to a clock source included within the input/output processor 200 to synchronize the operations of each memory module from a common system |

| LOCAL MEMORY INTERFACE LINES | |
|---|---|
| Designation | Description |
| | clock source |

While FIGS. 5a through 5d show the lines which connect the different modules of the system of FIG. 1 to the SIU 100, it will be appreciated that other lines are also included for signaling other conditions as for example error conditions and operational conditions. Having described the different types of interfaces utilized by the modules of FIG. 1, each of the modules pertinent to the understanding of the present invention will now be described in greater detail.

DETAILED DESCRIPTION OF INPUT/OUTPUT PROCESSOR PAIR 200-0

Figure 2:
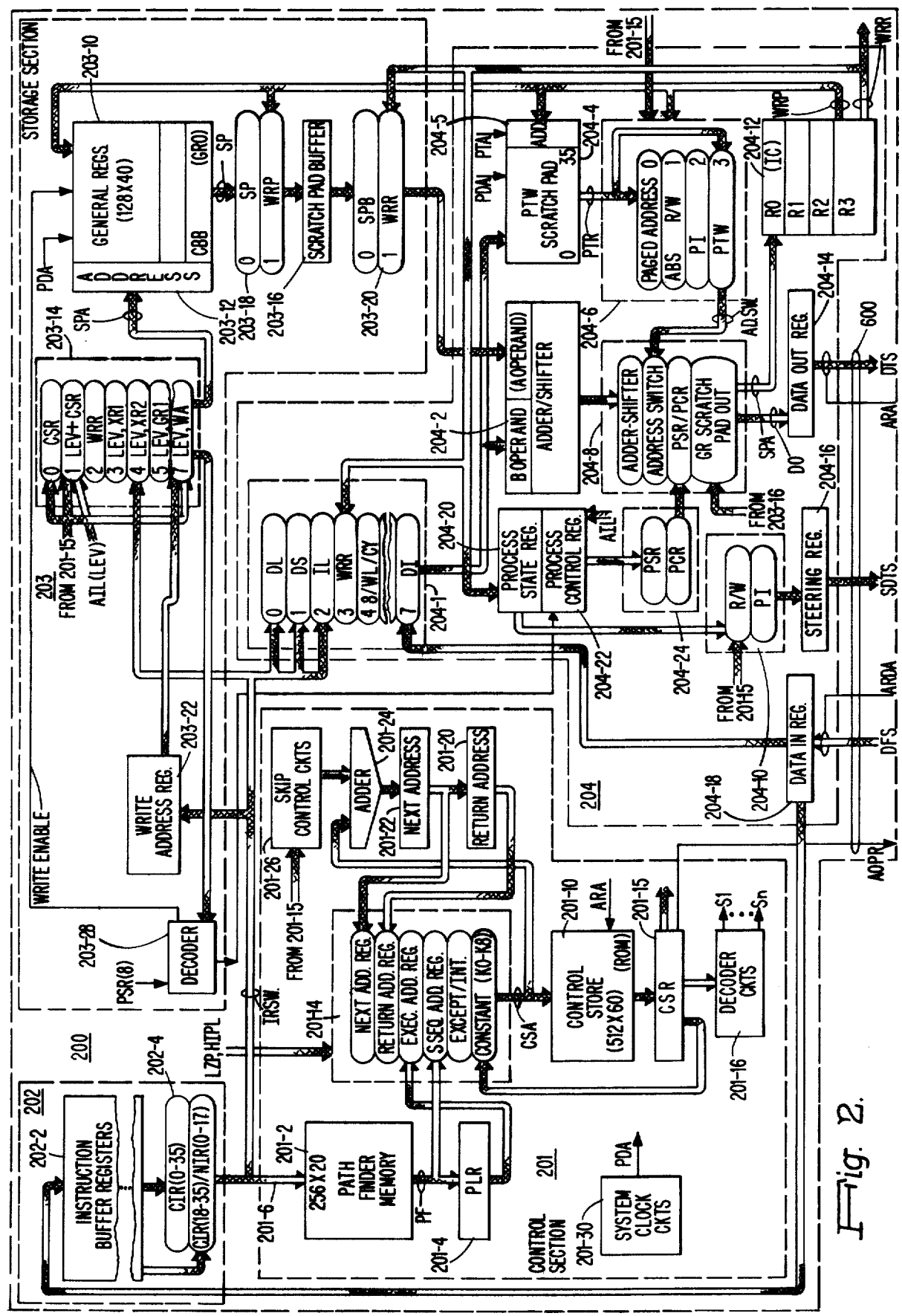
FIG. 2 shows in greater detail the input/output processing unit of FIG. 1.

Referring to FIG. 2, it is seen that each processor 200 of pair PO comprises a microprogrammed control section 201 operative to generate control signals in response to microinstructions stored in a control store 201-10 for executing instructions, an instruction buffer section 202 for storing instructions fetched from the local memory module 500, a storage section 203 and a processing section 204 for performing arithmetic and logic operations under the control of microprograms stored in control store 201-10. The processor pair arrangement ensures system reliability and is discussed in detail in the first referenced application.

CONTROL STORE SECTION 201

Considering each section in greater detail, the control store 201-10 is constructed of fixed sections which use for example a read only (ROM). The store 201-10 is addressable via signals from any one of the eight address sources applied to a selector switch 201-14. The contents of the addressed locations are read out into an output register 201-15 and decoded by decoder circuits included within a block 201-16.

Additionally, as shown, signals from one of the fields of the microinstruction contents of register 201-15 are applied as an input to the switch 201-14 for selecting which one of the eight input sources is to apply an address to control store 201-10. The microinstructions read out to register 201-15 include address constants for branching the control store 201-10 to appropriate microprogram routines.

As seen from FIG. 2, the eight control store address sources include: interrupt/exception signals derived from signals applied by the system interface unit 100 and circuits included within processor 200; a next address register position which receives next address information stored in a register 201-22 via an adder circuit 201-24; a return address register position which receives the return address contents of a return register 201-20; an execution address register position which receives an address from a pathfinder memory 201-2 via memory output register 201-4; a sequence address register position which also receives an address from register 201-4; and a constant position which receives a constant value from the output register 201-15.

The appropriate next address is generated by adder circuit 201-24 which receives as one operand input, address signals from one of the sources selected by switch 201-14 and as other operand input, signals from skip control circuits of a block 201-26. The skip control circuits are conditioned by constant signals stored in control store register 201-15 which in turn provide an appropriate value as one of the operand inputs to the adder 201-24. The resultant address generated by adder circuit 201-24 represents the sum of the addresses applied by switch 201-14 and constant signals provided by skip control circuits of block 201-26. Briefly, the different positions of switch 201-14 are selected in response to microinstructions read from control store 201-10 to provide appropriate addresses for microprograms stored in control store 201-10 required for the execution of an operation specified by the op code of a program instruction. The instruction op code is applied to the pathfinder memory 201-2 via path 201-6 as shown. The return address register position of switch 201-14 is selected during program sequencing as a consequence of a branch operation while the constant register position is selected to provide for a branch to a predetermined location in the control store 201-10 defined by the constant field of the microinstruction stored in register 201-15.

Interrupts are processed at the completion of execution of a program instruction. It is seen in FIG. 2 that a higher level interrupt present (HLIP) and level zero interrupt (LZP) lines apply signals to switch 201-14. The signal applied to the HLIP line is "ANDed" with interrupt inhibit signals from a process control register 204-22 and the result is ORed with the signal applied to the LZP line. When the higher level interrupt present signal is not inhibited or there is a signal applied to the LZP line, signals from circuits, not shown connected to switch 201-14 select the exception/interrupt position. The signal lines indicative of the presence of an interrupt (LZP and HIPL) cause the selection of an interrupt sequence of microinstructions to be referenced in lieu of referencing the microinstruction sequence for executing the next program instruction.

Signal lines indicative of "exceptions" are applied to control circuits, not shown, associated with switch 201-14 and cause the selection of the exception/interrupt position. This provides an address for referencing an exception sequence of microinstructions. Depending upon the type of execution, the exception may be processed immediately because continuing program instruction execution must be prevented or it is not possible (e.g. faults, illegal instructions). The exception is processed upon the completion of execution of the program instruction where the condition does not require immediate attention (e.g. time out, overflow, etc.). As explained herein, the occurrence of exceptions cause the exception/interrupt position of 201-14 to be selected and the setting of an appropriate bit position in process control register 204-22.

Timing signals, designated as PDA in FIG. 1, required for establishing appropriate memory cycles of operation for control section 201 as well as timing signals for operating other sections of processor 200 and the other modules of the system of FIG. 1 are provided by clock circuits included within a block 201-30. For the purpose of the present invention, the clock circuits as well as the other circuits of FIG. 2 can be considered conventional in design and can for example take the form of circuits disclosed in the publication titled "The Integrated Circuits Catalog for Design Engineers" by Texas Instruments Inc., printed 1972. More specifically, the clock circuits can comprise a crystal controlled oscillator and counter circuits while the switch 201-14 can comprise a plurality of data selector/multiplexer circuits.

From the above, it is seen that as in most microprogrammed control machines, the control store 201-10 provides the necessary control for each processor cycle of operation. That is, each microinstruction word read out from control store 201-10 during a cycle of operation is divided into a number of separate control fields which provide the necessary input signals to the various selector switches of FIG. 2 for addressing of the different scratch pad memories and selection of operands, signals for specifying various test conditions for branching, signals for controlling the operation of an adder/shifter unit of section 204 and signals for providing control information necessary for generating commands. For more detailed information regarding the operation of control section 201, reference may be made to U.S. Pat. No. 4,001,788 titled "Pathfinder Microprogram Control System" invented by G. Wesley Patterson, et al which is assigned to the assignee of the present invention. Reference may also be made to other ones of the documents referenced in the introductory portion of the specification.

INSTRUCTION BUFFER SECTION 202

This section includes a plurality of registers 202-2 for storing up to four words of instructions fetched from local memory module 500 and applied via a data in register 204-18. The group of registers 202-2 are connected to a two position instruction register switch 202-4 which is arranged to provide two outputs, a current instruction read output (CIR) and a next instruction read output (NIR). The selection of instruction words on a half or full word basis is made in accordance with the states of bit positions of the current instruction counter (IC) normally stored in a first of the working registers of block 204-12. For the purpose of the present invention, the arrangement can be considered conventional in design.

STORAGE SECTION 203

As seen from FIG. 2, this section comprises a scratch pad memory containing eight sets or groups of registers associated with eight different processes each assigned a different one of eight priority levels. The highest priority level is level 0 and the lowest priority level is level 7. Each group or level includes 16 registers used as described herein.

The scratch pad memory 203-10 is addressed via an eight position data selector switch 203-14 which selectively applies a seven bit address from any one of eight sources to address inputs 203-12. The three most significant bit positions of address inputs 203-12 select one of the eight sets of registers (i.e. the level) while the remaining four bits select one of the sixteen registers. Signals applied to the active interrupt level (AIL) lines by the SIU 100 provide the three most significant bits to the scratch pad address inputs 203-12. The remaining signals are provided by control store register 201-15 or fields from the instruction applied via the IRSW.

The write address register 203-22 is loaded via switch 202-4 to store signals corresponding to either bits 9-12 or bits 14-17 of the current program instruction as designated by one of the fields of the microinstruction contained in register 201-15. Accordingly, the write address register provides address storage for loading or returning a result to one of the general registers of scratch pad memory 203-10. The write operation occurs upon the generation of a write clock signal which occurs either in response to switching to a binary ONE a clocked write flip-flop not shown, or in response to a field of a microinstruction loaded into register 201-15. When generated by the write flip-flop, the write clock signal occurs when the write flip-flop is reset to a binary ZERO upon the occurrence of a next PDA clock pulse. This allows a write operation relating to a program instruction to occur during the start of processing the next instruction.

It will be noted that the contents of the write address register 203-22 are applied to a decoder network 203-28 via selector switch 203-14 which is operative to generate a signal on an output line each time register 203-22 stores an address of 0, 1 or 15. This signal inhibits the generation of a write clock pulse by gating circuits, not shown, when write flip-flop is in a binary ONE state. Additionally, the decoder network 203-28 receives a mode signal from the process state register 204-20. The state of the signal which indicates whether the processor 200 is in a master or slave mode of operation is "ANDED" with the output signal and is used to generate an exception signal on another output line which is applied as an input to process control register 204-22 and to one causes selection of the exception-interrupt position of switch 201-14. As explained herein, this prevents alteration of the contents of the process state register location (GRO) of scratch pad memory 203-10.

The contents of an addressed register location are read out into a scratch buffer register 203-16 via a first two position data selector switch 203-18. The contents of the buffer register 203-16 are then selectively applied to processing section 204 via a further two position data selector switch 203-20. The different positions of each of the data selector switches 203-14, 203-18, and 203-20 are selectable by different fields contained in the microinstructions read out into register 201-15. The scratch pad memory 203-10 receives data signals applied from one of a pair of output buses selectively connected to any one of four working registers of block 204-12.

Each set of 16 registers includes a process state register (PSR) location (general register 0) for storing information essential to controlling the current process. The first eight bit positions of the register stores steering information coded to identify the interrupting module. The next position is a privilege bit position coded to identify the mode of operation (i.e. master or slave). The register also includes an external register bit position coded to indicate whether the register contents can be altered, an address mode bit position, two condition code bit positions, a carry bit position and 22 bit positions for storing a count which is periodically decremented while the associated process is active (i.e. serves as a "process timer"). Because of the frequency of access to the contents of the process state register required for modification or reference, signals representative of the contents of this register are stored in one of the registers of the processing section 204 (i.e. register 204-20). Thus, the general register storage location for storing the contents of the process state register serves to store the current value of the process state register of section 204 upon the occurrence of an interrupt.

Each group of registers further includes an instruction counter (general register 1) for storing the address of the current instruction of the process associated therewith. Additionally, each group of registers include a page table base register (general register 15), and a number of general registers (general registers 2-14) for providing temporary storage for operands and address information. The scratch pad memory 203-10 also includes a control block base (CBB) register location which stores an absolute address pointing to the base of an exception control block and interrupt control block tables stored in local memory module 500. the first register GRO of the highest priority set of registers (level 0) which is never altered, stores the control block base information. The interrupt control block (ICB) tables include 256 groups of storage locations which store information for processing the type of interrupt. The exception control block (ECB) tables include 16 groups of storage locations which store information for processing the type of exception.

Exceptions are processor detected conditions which cause the processor 200 to enter automatically one of the 16 exception processing routines. The exception conditions are identified by a four bit exception number which corresponds to bits 10–13 of the program instruction when the processor enters master mode. In all other instances, the exception number is ZERO. The exception number (ECB#) is used to identify one of the four word exception control blocks (ECB) which points to an exception processing routine. The byte address of an ECB equals the control block base (CBB) - 16 (ECB #+1). Each ECB includes values for loading the PSR, IC and PTBR registers in addition to a saving area pointer which serves as a stack area for storing information pertinent to the current process before the processor 200 enters the exception routine.

The address of an interrupt control block (ICB) equals the control block base (CBB) + 16(ICB#). The ICB# is obtained from the interrupt word as explained herein. Similarly, the ICB is a four word block and it contains values for the PSR, IC, GR14 and PTBR registers.

PROCESSING SECTION 204

This section performs all of the arithmetic and logic operations required to process program instructions. The section 204 includes an adder/shifter unit 204-1 capable of performing arithmetic, shift and logic operations upon a pair of 36 bit operands. The results produced by either an adder portion or shifter portion of unit 204-1 are selected in response to microinstructions and thereafter selectively transferred via a four position data selector switch 204-8 on a pair of output lines to any one of the working registers of block 204-12 and to a data output register 204-14. The data output register 204-14 connects to the lines of the processor data interface 600.

For the purposes of the present invention, the adder/shifter unit 204-1 can be considered conventional in design. Also, the unit 204-1 may include either circuits such as those disclosed in U.S. Pat. No. 3,811,039 to John P. Stafford or circuits disclosed in other documents referenced in the introductory portion of the present specification.

The block 204-12 includes four working registers R0 through R3 which provide temporary storage for the instruction counter and for addresses during instruction execution. The registers can be loaded from any one of the sources connected to switch 204-8 (i.e. adder/shifter 204-1, address switch 204-6, PSR/PCR switch 204-24 and scratch pad buffer input switch 203-18). The register to be loaded and the write signal required for loading the register is established by fields included within the microinstruction read out to register 201-15.

As seen from FIG. 2, the registers are connected to a pair of output buses WRP and WRR. The WRP bus connects to address inputs 204-5, to switch 203-18 and to scratch pad memory 203-10. The WRR bus connects to A operand switch 203-20, to B operand switch 204-1, to register 204-20 and to register 204-22. The registers selected for connection to the WRR and WRP buses are designated by a pair of fields included within the microinstruction read out to register 201-15.

As seen from FIG. 2, the processing section 204 includes process state register 204-20 and a process control register 204-22. The process state register 204-20 as mentioned is loaded from scratch pad memory 203-10 via output bus WRR. The process control register 204-22 is a 36 bit register common to all eight interrupt levels.

The bit positions of the process control register 204-22 contain the following information. Bit positions 0-8 designate different types of non master mode exceptions which include the following.

| PCR BIT POSITION | EXCEPTION TYPE |
|---|---|
| 0 | Operation not complete; no response from SIU 100 on lines ARA or ARDA. |
| 1 | Page address bounds fault (key check). |
| 2 | Page access fault |
| 3 | Page not resident in memory |
| 4 | Illegal operation |
| 5 | Process timer run out |
| 6 | Overflow |
| 7 | Lockup fault |
| 8 | Address misalignment |

The term "fault" does not necessarily mean the occurence of a hardware failure but includes error conditions, etc.

Bit positions 9-15 identify the location of parity errors and bit positions 23-26 identify the processor number and level received from the PNID and AIL lines. Bit position 27 is an interrupt inhibit bit position while bit positions 28-35 store interrupt request bits which when set to a binary ONE indicate an interrupt at a level corresponding to the bit position (e.g. bit 28 = level 0). The bit positions 27-35 loadable by program instruction from the bank of registers of block 204-12 via output bus WRR. The contents of each of the registers 204-20 and 204-22 are selectively applied as an input to another one of the positions of the four position data selector switch 204-8 via a two position data selector switch 204-24. The register 204-20 also connects to the PI positions of a two position steering selector switch 204-10 and a four position address selector switch 204-6.

The steering switch 204-10 provides steering information to the SIU 100 which is used to transfer the command to the correct module. One of the fields contained in the microinstructions read out to register 201-15 selects the appropriate position for either a memory command or PI command. The steering information for a memory command is generated from fields included within the microinstruction and with paged address information from scratch pad memory 204-4 or absolute address information from bus WRP.

For a R/W command, the steering information is generated as follows: bit 0 is a binary ZERO for a R/W command; bit 1 defines local/remote memory and corresponds to PTW bit 0 (paged) or WRP bit 0 (absolute). Bits 2-4 correspond to PTW bits 1-3 (paged) or WRP bits 1-3 (absolute). Bits 5-6 correspond to bits of one of the fields of the microinstruction which are coded to designate whether it is a single or double word transfer and whether it is a read or write cycle of operation.

Upon the start of a memory cycle or initiation of a command, the signals from the steering switch 204-10 are loaded into a steering register 204-16 which applies the signals to the appropriate lines of the data interface 600 of processor 200. As explained herein, the command including additional steering information is provided by position 2 of address switch 204-6 in the case of a PI command.

As also seen from FIG. 2, processing section 204 includes a scratch pad memory 204-4 addressable via address inputs 204-5 which receives address signals from one of the registers connected to the WRP bus. The scratch pad memory 204-4 provides page table address storage for each of the eight interrupt levels used in generating absolute addresses for addressing local memory module 500. When addressed, the contents of the storage location of scratch pad memory 204-4 are read out to two of the four positions of the address switch 204-6. These two positions are used for page referencing of local memory module 500. Since the paging operations of scratch pad memory 204-4 are not particularly pertinent to the present invention, no detailed discussion is included herein.

The other two positions of the address selector switch 204-6 are used to provide the memory or PI command. More specifically, position 1 of address switch 204-6 when selected by an address control field of a microinstruction word stored in register 201-15 generates the R/W memory command information which includes bits 0-8 in accordance with predetermined fields of the microinstruction word and bits 9-35 coded to correspond to either paged address information from memory 204-4 or absolute address bits applied to output bus WRP by the working registers of block 204-12. When the PI position of switch 204-6 is selected, the switch generates a programmable interface command word wherein bit 0 is a binary ZERO, bit 1 is supplied by a field of the microinstruction word stored in register 201-15, bit 2 is supplied by bit 9 of PSR register 204-20 and defines whether the current process can alter certain external reigsters, bits 5-8 are equal to bits 4-7 of register 204-20 and define the port or subchannel within the module, bit 3 is coded to specify the processor pair number supplied by the SIU 100, bit 4 is a ZERO and bits 9-35 equal bits 9-35 of bus WRP which correspond to the absolute address of the PI command.

DETAILED DESCRIPTION OF LOCAL MEMORY MODULE 500

Figure 4:
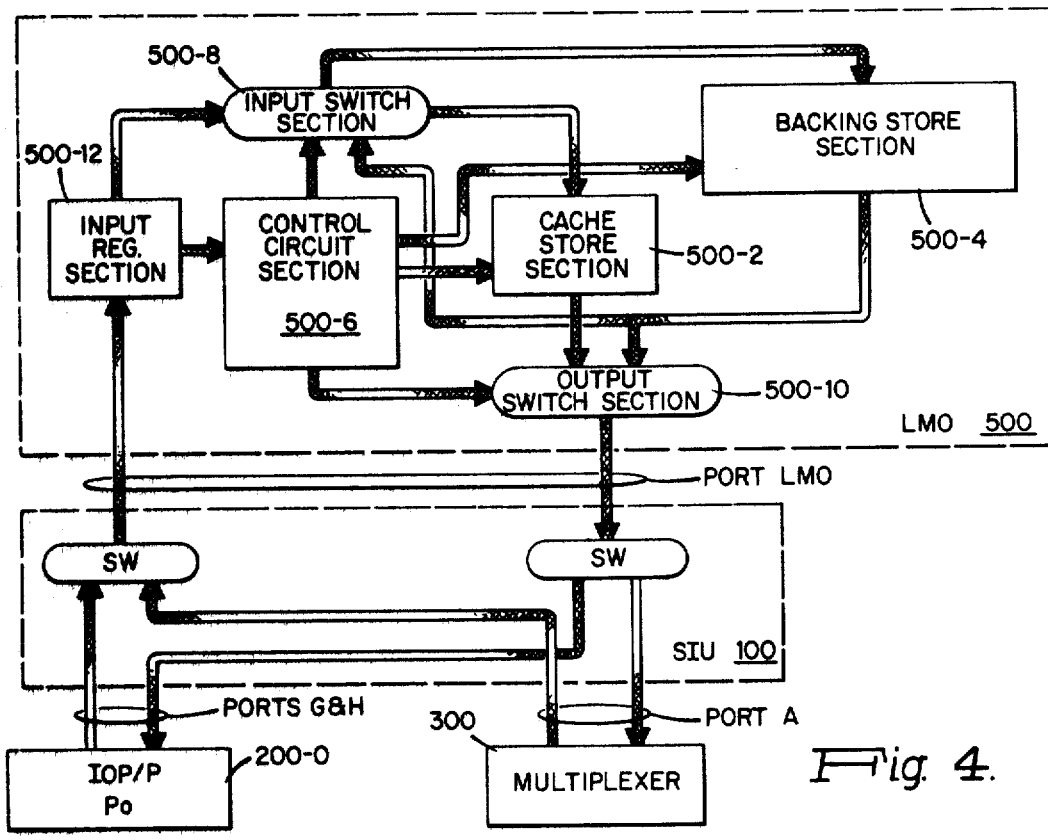
FIG. 4 is a block diagram used in explaining the operation of the present invention.

FIG. 4 illustrates the system of the present invention and a preferred embodiment of local memory module 500 in accordance with the teachings of the present invention. Referring to the figure, it is seen that module 500 includes a cache store section 500-2, a backing store section 500-4, an input register section 500-12, a control circuit section 500-6, an input switch section 500-8 and an output switch section 500-10 arranged as shown. The output switch section 500-10 and input register section 500-12 transfer and receive data and control information to and from either the processor pair PO or multiplexer module 300 via SIU 100 switches as explained herein.

Figure 6:
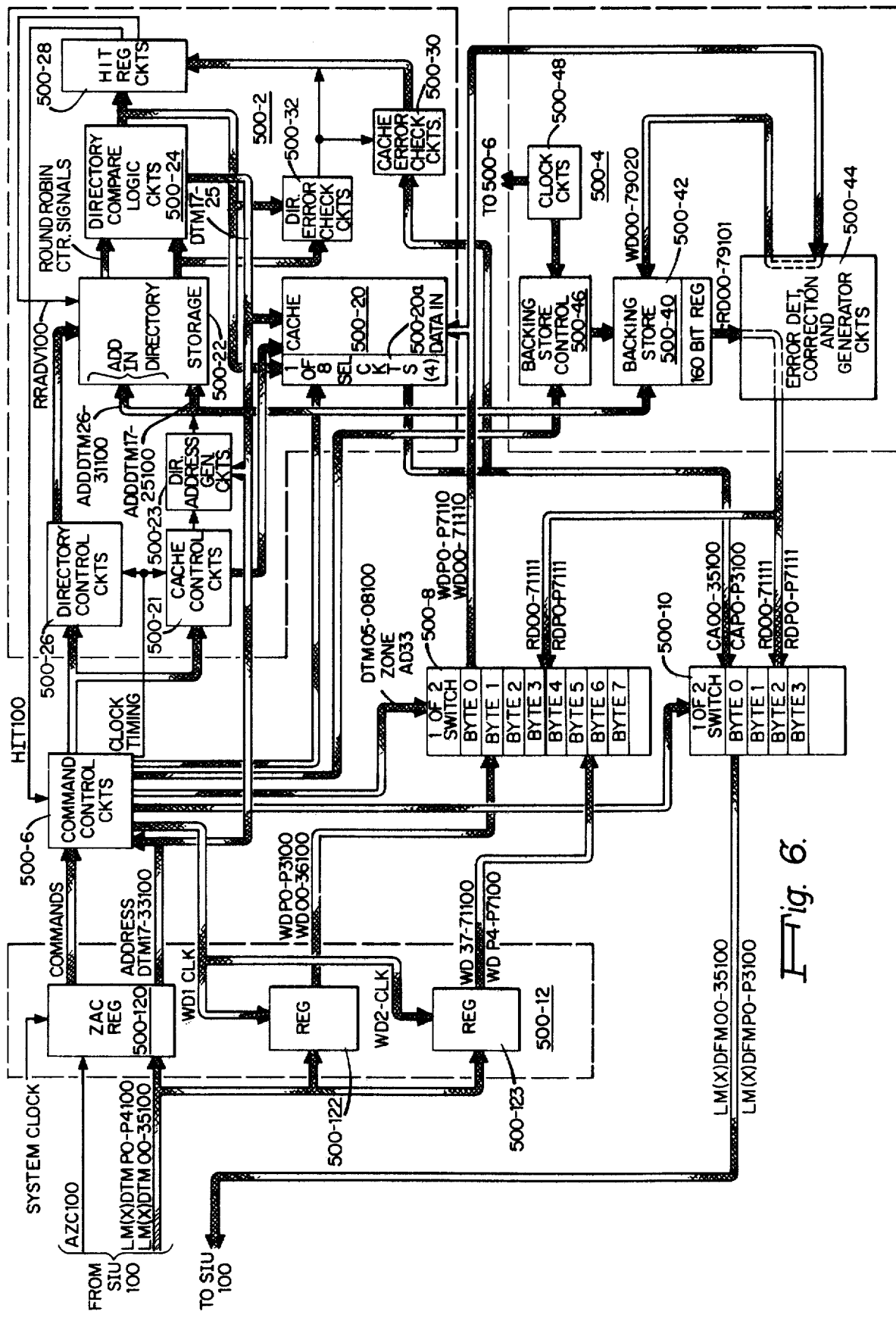
FIG. 6 shows in block diagram form the local memory module of FIG. 1.

The cache store section 500-2 is shown in greater detail in FIG. 6. As seen, the section 500-2 includes a cache 500-20 with associated control circuits 500-21, a directory storage unit 500-22 with associated comparison circuits 500-24, address generation circuits 500-23, directory error check circuits 500-32, cache error check circuits 500-30, hit logic circuits 500-28 and control circuits 500-26 arranged as shown. The cache store is organized into four levels or sections each of which are constructed from a plurality of bipolar circuit chips, conventional in design. Each level is divided into eight byte sections with each byte section including five bipolar circuit chips. The circuit chips each contains 128 addressable two bit wide storage locations with the total number of chips providing a capacity of 64 block address locations or 256 address locations wherein each block is defined as 4, 40 bit words, each word having four bytes (byte = 9 data bits + 1 parity bit). As explained herein, the error check circuits of 500-30 perform a parity check on the information read out from cache store 500-20.

The directory storage unit 500-22 stores the addresses of each cache block and is similarly organized into four levels. The unit 500-22 includes a round robin counter arrangement (not shown) for establishing which level of cache is to be written during a next cycle of operation. The different levels of cache define a column of 80 bits and cache block includes two such columns. The directory storage unit 500-22 is thus divided into a number of columns corresponding to the number of blocks in the cache. For the purpose of the present invention, the organization can be considered conventional in design and may be likened to the arrangement disclosed in U.S. Pat. No. 3,845,474 invented by Ronald E. Lange, et al. During a cache cycle of operation, four bytes are read out to the output multiplexer switch 500-10 via a number of one of eight selector circuits 500-20a shown in greater detail in FIG. 7c.

The directory storage unit 500-22 applies address signals to the comparison circuits of block 500-24. These circuits, conventional in design, operate to detect whether the information being requested resides in cache at any one of the four levels (i.e., presence of a hit). The compare circuits 500-24 apply the results of the comparison to the hit circuits or block 500-28. The hit circuits 500-28 in turn store the hit indications which are applied as inputs to the control logic circuits of block 500-6. As explained herein, the directory address generation circuits 500-23 generate parity check bits for the address hits DTM 17-25 to be written into one of the four levels. The directory error check circuits 500-32 perform a parity check on the address read out from directory 500-22 to ensure that the correct information is fetched from cache store 500-20.

The backing store section 500-4 includes a backing store 500-40, timing circuits 500-48, a 160 bit output register 500-42, data correction and parity generator circuits 500-44 and a number of control circuits of block 500-46 arranged as shown in FIG. 6. The circuits 500-48 include counter and delay line circuits. Conventional in design, which provide timing and control signals for synchronizing the overall operation of the memory module 500-2.

The backing store 500-40 is constructed from 4K MOS memory chips, conventional in design and has a capacity of 128K of memory words, each word having 40 bits (32K blocks). The data correction and parity generation circuits shown in greater detail in FIG. 7d operate to detect and correct errors in the words being read from and being written into backing store 500-40. For the purpose of the present invention, these circuits may be considered conventional in design.

As seen from FIG. 6, the input register section includes a zone, address and command (ZAC) register 500-120, a first word buffer register 500-122 and second word buffer register 500-123 connected as shown. The ZAC register 500-120 stores the ZAC command word which has the format shown in FIG. 8. The input buffer registers 500-122 and 500-123 are connected to receive the data word or words of a ZAC command applied to the DTM lines of interface 603 by a requester module. The contents of registers 500-122 and 500-123 are applied to different byte positions of the one of two multiplexer switch 500-8. The switch 500-8 also receives the data read from backing store to be written into cache 500-20.

The command contents of the ZAC register 500-120 are applied to decoder gating circuits included in block 500-6 while the address signals are distributed to the circuits of block 500-6, directory storage unit 500-22, cache 500-20 and backing store 500-40 for the addressing thereof.

The circuits of block 500-6 generate the various control and timing signals for conditioning different portions of the local memory module for carrying out the operation specified by the command stored in ZAC register 500-120. This includes distributing control signals to input multiplexer switch 500-8 and to output multiplexer switch 500-10 for selecting the group of data signals to be written into backing store 500-40 and to be read from backing store 500-40 and cache 500-20 respectively. For the purpose of the present invention, the multiplexer or data selector circuits and registers in addition to the circuits of FIGS. 7a through 7d to be discussed herein can be considered conventional in design and may take the form of circuits disclosed in the aforementioned Texas Instruments text.

Figure 7A:
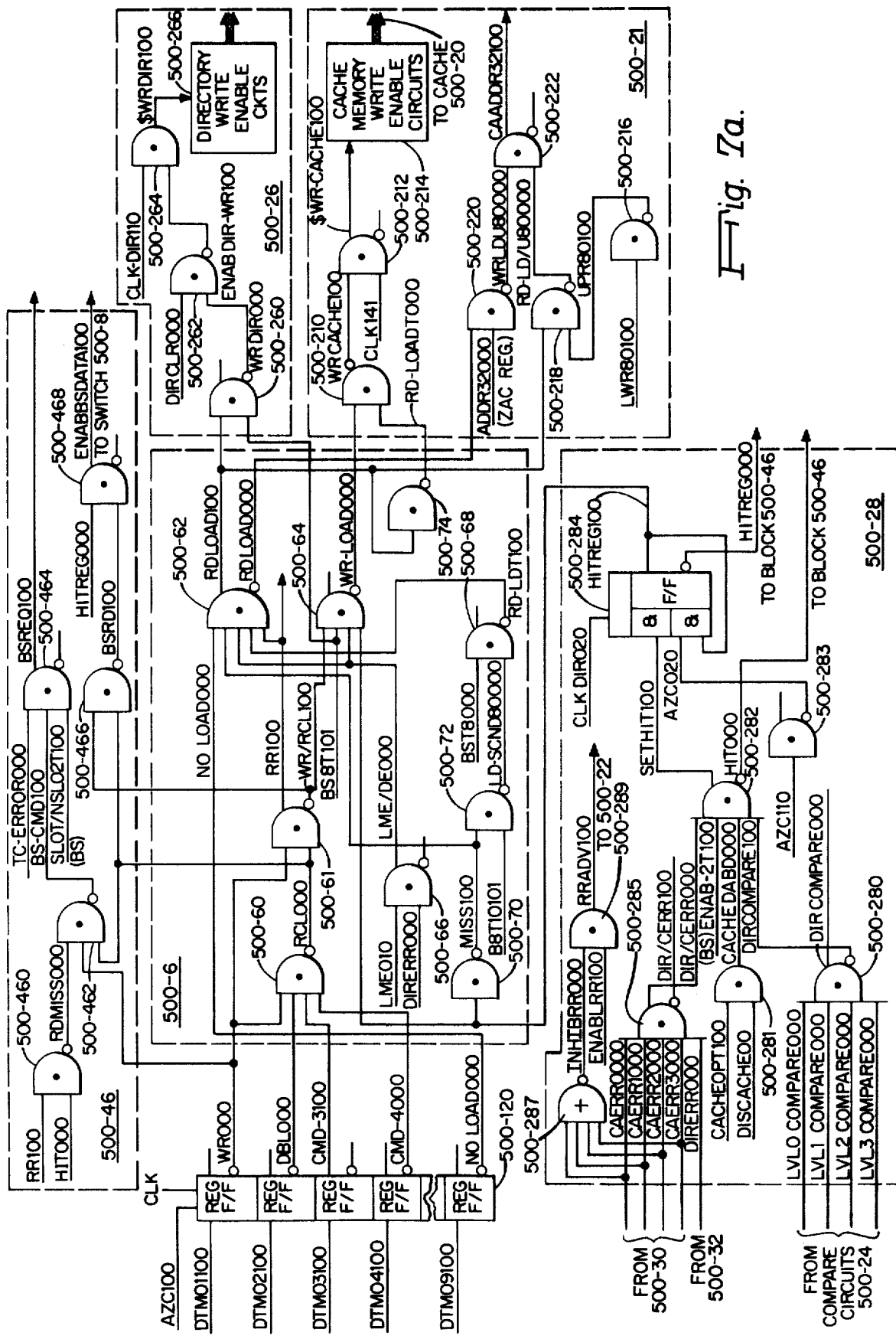
FIGS. 7a through 7d show in greater detail portions of the local memory module of FIG. 6.

FIG. 7a shows in greater detail certain ones of the circuits of blocks 500-6, 500-21, 500-26 and 500-46. Referring to the figure, it is seen that the control circuits of block 500-6 include a plurality of AND/NAND gates 500-60 through 500-74. The gates 500-60, 500-61 and 500-62 are connected to receive different ones of the ZAC command bit signals and the cache bypass signal from ZAC register 500-120. These signals are combined as shown and applied to gates 500-64 and 500-74. The resulting read load and write load command signals are applied to the cache control circuits 500-21, the directory control circuits 500-26 and the backing store control circuits 500-46 as shown. The other command signals such as RCL000 and RR100 are also applied to the backing store circuits 500-46.

As seen from FIG. 7a, the cache control circuits 500-21 include series connected NAND/AND gates 500-210 and 500-212 which provide a write cache timing signal, WRCACHE100, to a write clock enable circuit 500-214. The write enable circuit 500-214 includes logic gating circuits, conventional in design, which provide the appropriate timing signals to the cache 500-20 required for its execution of a write cycle of operation. Additionally, the control circuits further include AND/NAND gates 500-216 through 500-222 which are operative to modify the state of address bit 32 as required for writing into cache store a block of data from backing store 500-40.

Similarly, the directory control circuits include series connected NAND/AND gates 500-260, 500-262 and 500-264, the last of which provides a write directory timing signal SWRDIR100 to a write enable circuit 500-266. The write enable circuit 500-266 includes logic gating circuits, conventional in design, which provide the appropriate timing signals to the directory storage unit 500-22 required for its execution of a write cycle of operation.

The backing store control circuits 500-46 include series connected AND/NAND gates 500-460 through 500-468. These gates are operative to generate a backing store request signal BSREQ100 and enable data signal to initiate a backing store read-write cycle of operation and allow transfer of backing store data to SIU 100.

The last group of circuits in FIG. 7a constitute the hit register circuits 500-28 of FIG. 6. The circuits include NAND/AND gates 500-280 and 500-282 in addition to an AND gate 500-281 connected as shown. The NAND/AND gate 500-280 receives the resulting comparison signals from comparison circuits 500-24 and applies an indication of a directory comparison to gate 500-282. The output of gate 500-282 in turn is applied to the set input of a hit register flip-flop 500-284. A NAND/AND gate 500-284 receives an accept ZAC signal from SIU 100 which it complements and applies to a reset input of flip-flop 500-284. The binary ONE and ZERO output signals from flip-flop 500-284 are thereafter distributed to different ones of the blocks of FIG. 7a as shown.

In accordance with the teachings of the present invention, the hit register circuits 500-28 are connected to receive error signals from the directory error check circuits 500-32 and cache error check circuits 500-30 of FIG. 6. It should be noted that the AND output of gate 500-285 is applied as a further input to set hit gate 500-282. Accordingly, when any one of the error signals CAERR0000 through DIRERR000 is forced to a binary ZERO indicative of an error, this causes AND gate to force signal DIR/CERR000 to a binary ZERO. As explained herein, this inhibits gate 500-282 from switching signal SETH1T100 to a binary ONE notwithstanding the fact that the information is established as having being stored in cache store 500-20. This is effective to simulate a "miss" condition as explained herein. Additionally, the error signals CAERR0000 through CAERR3000 are applied to an OR gate 500-287 whose output is applied as one input to an AND gate 500-289. The output of AND gate 500-289 when a binary ONE enables the round robin counter included in block 500-22 to advance to a next count for addressing the next level of directory store unit 500-22. Accordingly, when anyone of the error signals is not a binary ONE indicative of a cache error condition, this inhibits AND gate 500-289 from advancing the count to the next level. This in turn enables the correct version of the information read out from backing store 500-40 to be written into cache store 500-20 when bypass bit 9 is set to a binary ZERO. Thus, signal INHIBRR000 from gate 500-287 can be viewed as a holding signal operative to ensure that the backing store information is written back into the same level of cache where it was stored when detected to be in error. This allows for the correction of "soft failures" such as transit and intermittent error conditions.

Figure 7B:
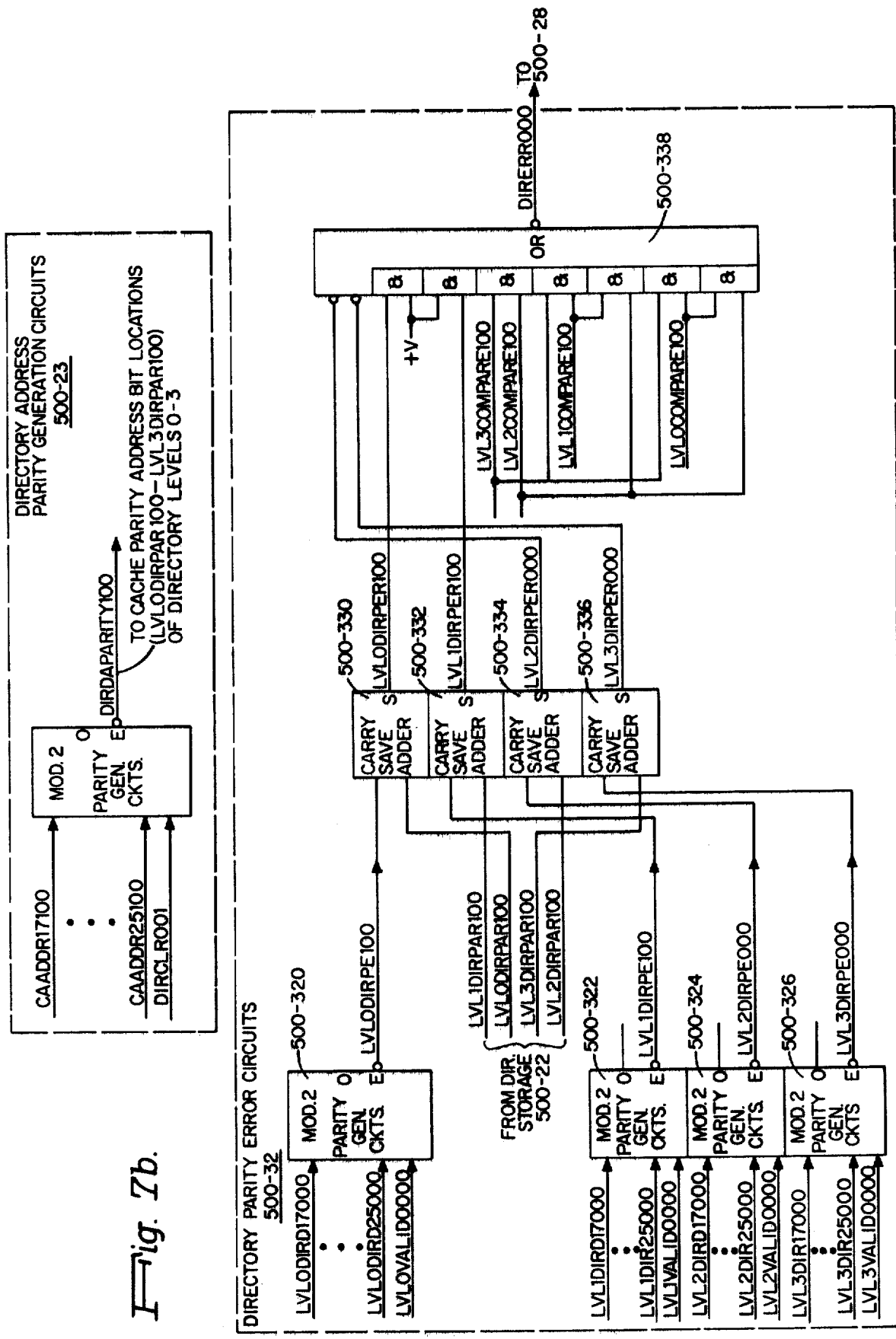

FIG. 7b shows in greater detail, the circuits 500-23. As seen from the Figure, the circuits include a parity generator circuit which in the absence of a clear operation (i.e., enabled by signal DIRCLR001) generates odd parity bit signal for the address bit signals CAADDR17100 through CAADDR25100. That is, it forces the directory parity signal DIRDAPARITY100 present at the even output terminal to a binary ZERO when there are an odd number of binary ONES present in signals CAADDR17100 through CAADDR25100.

Conversely, the parity generator circuit forces signal DIRDAPARITY100 to a binary ONE when there are an even number of binary ONES present in signals CAADDR17100 through CAADDR25100.

The directory parity error circuits 500-32, as seen from FIG. 7b, include a number of parity generator circuits 500-320 through 500-326 which generate parity error signals LVL0DIRPE100, LVL1DIRPE100, LVL2DIRPE000 and LVL3DIRPE000 for addresses read out from each of the four directory levels. Each of the circuits 500-320 through 500-326 is enabled by a corresponding one of the validity signals LVL0VALID0000 through LVL3VALID0000 respectively also read out from the directory storage unit 500-22.

It will be noted that signals LVL0DIRPE100 and LVL1DIRPE100 normally binary ONES in the absence of errors are applied from the even input terminals as inputs to corresponding ones of carry save adder circuits 500-330 through 500-336. The signals LVL2DIRPE000 and LVL3DIRPE000 normally binary ZEROS in the absence of errors are applied from the odd output terminals to corresponding ones of the carry save adder circuits 500-334 and 500-336.

Each of the carry save adder circuits 500-330 through 500-336 receive as a second input a corresponding one of the parity check bit signals LVL0DIRPAR100, LVL1DIRPAR100, LVL2DIRPAR000 and LVL3DIRPAR000. The adder circuits 500-330 through 500-336 sum without carry the pair of input signals. When the pair of inputs are equal, each of the output signals LVL0DIRPER100, LVL1DIRPER100, LVL2DIRPER000 and LVL3DIRPER000 is forced to a binary ZERO.

The signals LVL0DIRPER100 through LVL3DIRPER00 are applied as inputs to an AND/NOR gate 500-338. Additionally, the different level comparison signals from the directory compare circuits 500-24 are applied to different inputs of the gate 500-338 for determining the presence of more than one level comparison indicative of an error condition. When there is a difference between the address specified by the command and the address read out from the directory storage unit 500-22 or there is more than a single level comparison, gate 500-338 forces signal DIRERR000 to a binary ZERO.

Figure 7C:
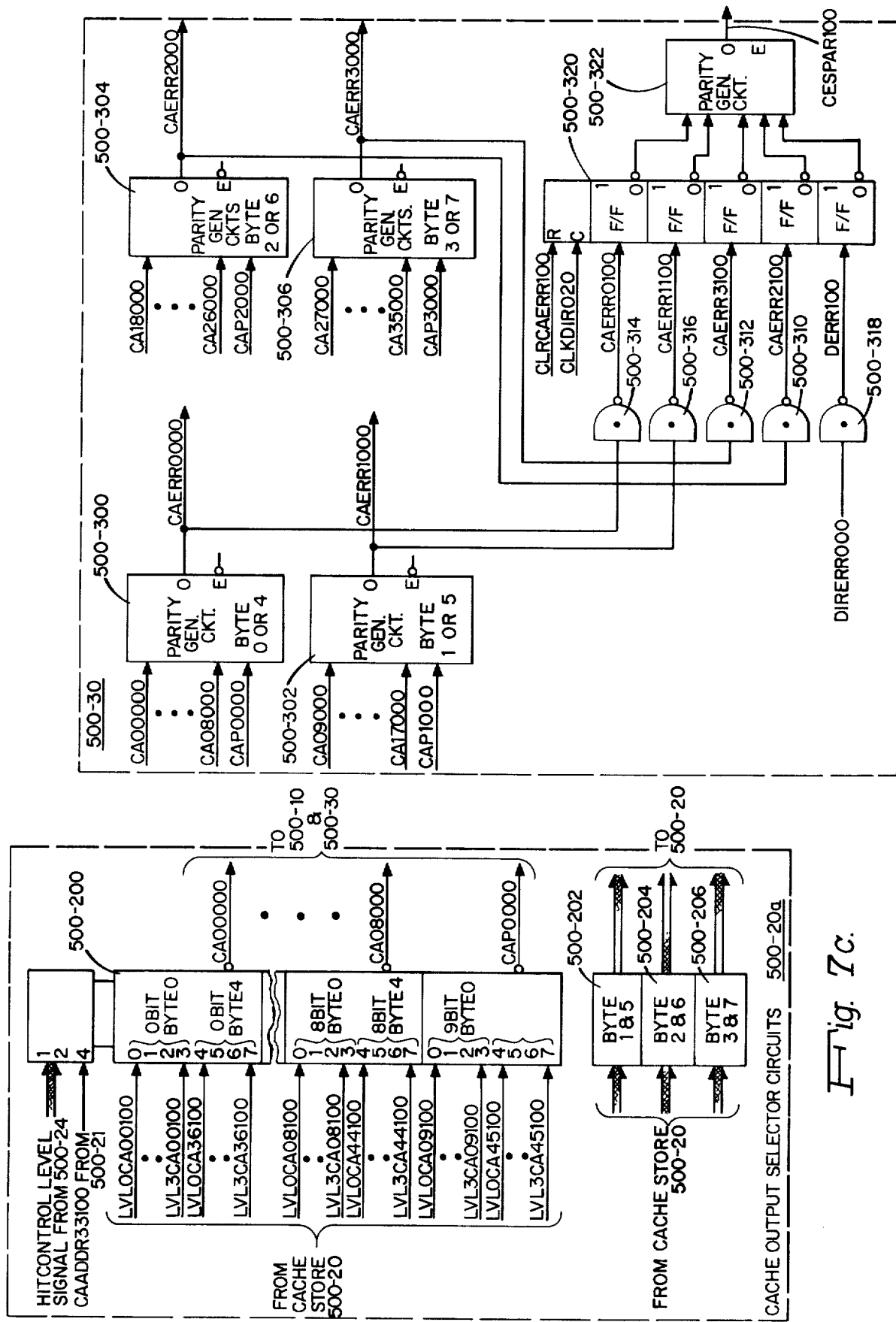

FIG. 7c illustrates in greater detail, the cache selector circuits 500-20a of FIG. 6. Each of the four groups of eight input data selector circuits 500-200 through 500-206 receive the signals from the four levels of cache store 500-20. Each group of selector circuits receive control signals designating which one of the eight data and parity bit signals is to be selected as an output. The parity and data output signals from the data selector circuits 500-200 through 500-206 in addition to being applied to switch 500-10 of FIG. 6 are applied as inputs to corresponding ones of a number of parity generator circuits 500-300 through 500-306.

Since the parity check signal is applied as an input to each parity generation circuit along with the data signals of each byte, the circuits in the absence of an error force signals CAERR000 through CAERR3000 to binary ONES. Stated differently, where a byte has bad parity corresponding to an even number of binary ONES, the error signal associated therewith presented at the odd output terminal (i.e., one of the signals CAERR0000 through CAERR3000) is forced to a binary ZERO state.

The cache error signals and directory error signals are inverted by corresponding ones of the NAND gates 500-310 through 500-318 and stored in a register 500-320 upon the occurrence of directory clocking signal CLKDIR020 from the circuits 500-266 of FIG. 7a. The binary ZERO outputs of the register 500-320 are applied to a parity generator circuit 500-322. The circuit 500-322 in the presence of an error signals forces a signal CESPAR100 at its odd terminal to a binary ONE. An indication of the cache or directory error condition is stored as status information by the memory system.

Figure 7D:
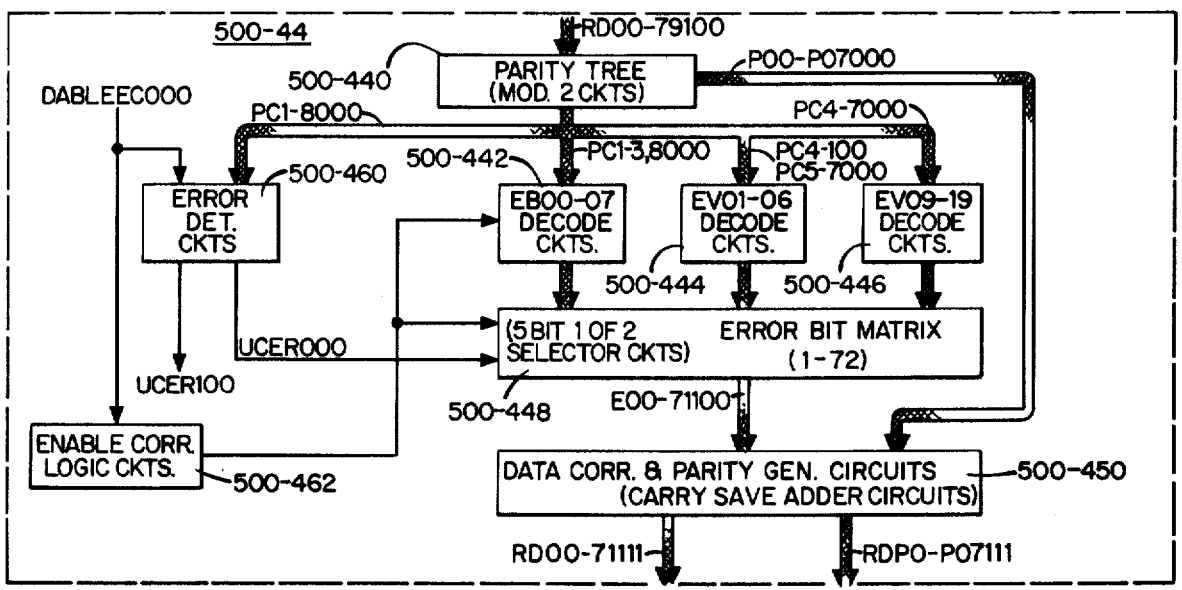

FIG. 7d shows in greater detail the error detection and correction circuits 500-44 of FIG. 6. As seen from the Figure, the circuits 500-44 include a number of parity generation circuits of block 500-440 which generate a number of check bit signals PC1-8000. Groups of these signals are applied to a number of binary to octal decoder circuits 500-442 through 500-446. The decoder signals are applied to a number of five input 1 of 2 data selector circuits of block 500-448. The selected output signals are applied to a number of carry save adder circuits of block 500-450 which operate to generate a corrected version of the input data signals RD00 through RD71100 upon the detection of a correctable error condition by the circuits of block 500-460 (i.e., signal UCER000=1). Parity generation circuits included in block 500-450 generate the check bit signals RDPO-PO7111 for the corrected version of the signals RD00 through RD71111. It will be noted that a disabling signal DABLEEC000 applied to the circuits of block 500-460 and block 500-462 is normally a binary ONE. Thus, the various sections of the error correction and detection circuits can be regarded as being normally enabled for operation.

Signals RD72 through RD79 correspond to the error code checb (ECC) bits generated by other parity generator circuits (not shown) included in block 500-44 which were written into store 50-46 during a previous write cycle of operation. The ECC signals RD72 through RD79 are used in a conventional manner to generate certain ones of the check bit signals PC1-8000.

It will be appreciated that for the purposes of the present invention, all of the error correction, detection and parity generation circuits 500-44 can be considered conventional in design. Also, such circuits may take the form of the circuits disclosed in patent application Ser. No. 727,821 entitled "Apparatus and Method for Storing Parity Encoded Data from a Plurality of Input/Output Sources" invented by George J. Barlow, et al.

DETAILED DESCRIPTION OF SYSTEM INTERFACE UNIT 100

Interrupt Section 101

Figure 3A:
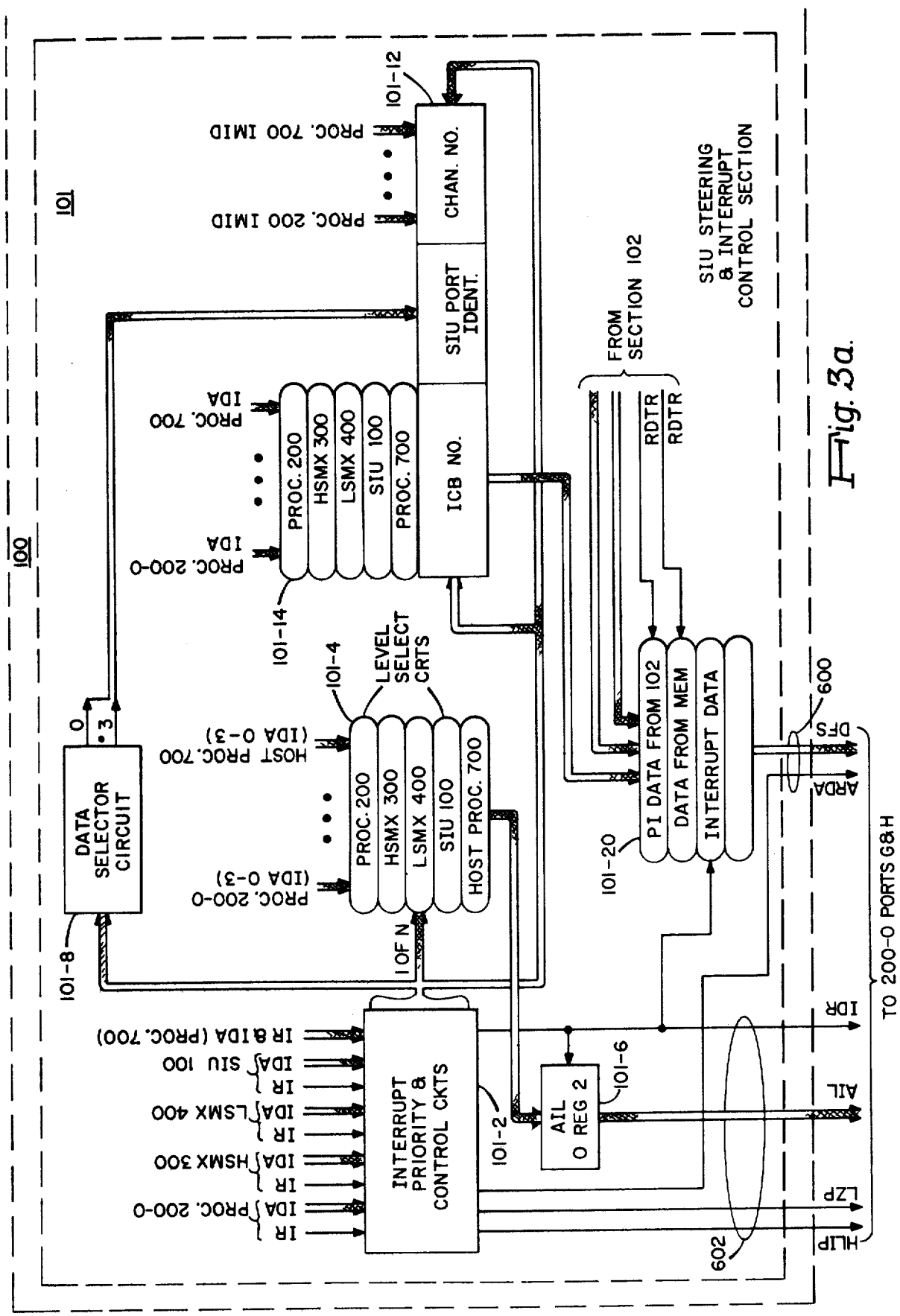
FIGS. 3a and 3b show in greater detail the system interface unit of FIG. 1.

The System Interface Unit 100 as mentioned provides for communication between modules of the system of FIG. 1 via a plurality of crossbar switches. Separate crossbar switches are used to collect signals from the lines of each of the different interfaces of the modules. FIG. 3a shows the switches and circuits of interrupt section 101 for handling the module interrupt interfaces. In the system of FIG. 1, there are modules which connect to ports LMO, A, E, G and J, each of which apply signals to the SIU 100 via different ones of the lines of its interrupt interface 602. Additionally, SIU 100 also provides signals via an interrupt interface associated with port L of FIG. 1.

As seen from FIG. 3a, each of the modules when requesting service applies a signal on its interrupt request (IR) line together with appropriate interrupt identifier information on its IDA lines which are applied to the circuits of an interrupt priority and control block 101-2. The circuits of block 101-2 monitor all interrupt interfaces and signals the appropriate processor corresponding to processor 200 when there is a request having a priority higher than that of the process being executed. When processor 200 signals that it is able to accept the request, the SIU 100 gates the identifier information associated with the highest priority request to processor 200. The identifier information includes an eight bit interrupt control block number including a parity bit, a three bit interrupt level number and an one bit processor number with a parity bit and a four bit channel number. For further information regarding interrupt section 101, reference may be made to U.S. Pat. No. 4,000,487, which issued on Dec. 28, 1976.

Data Transfer Section 102

Figure 3B:
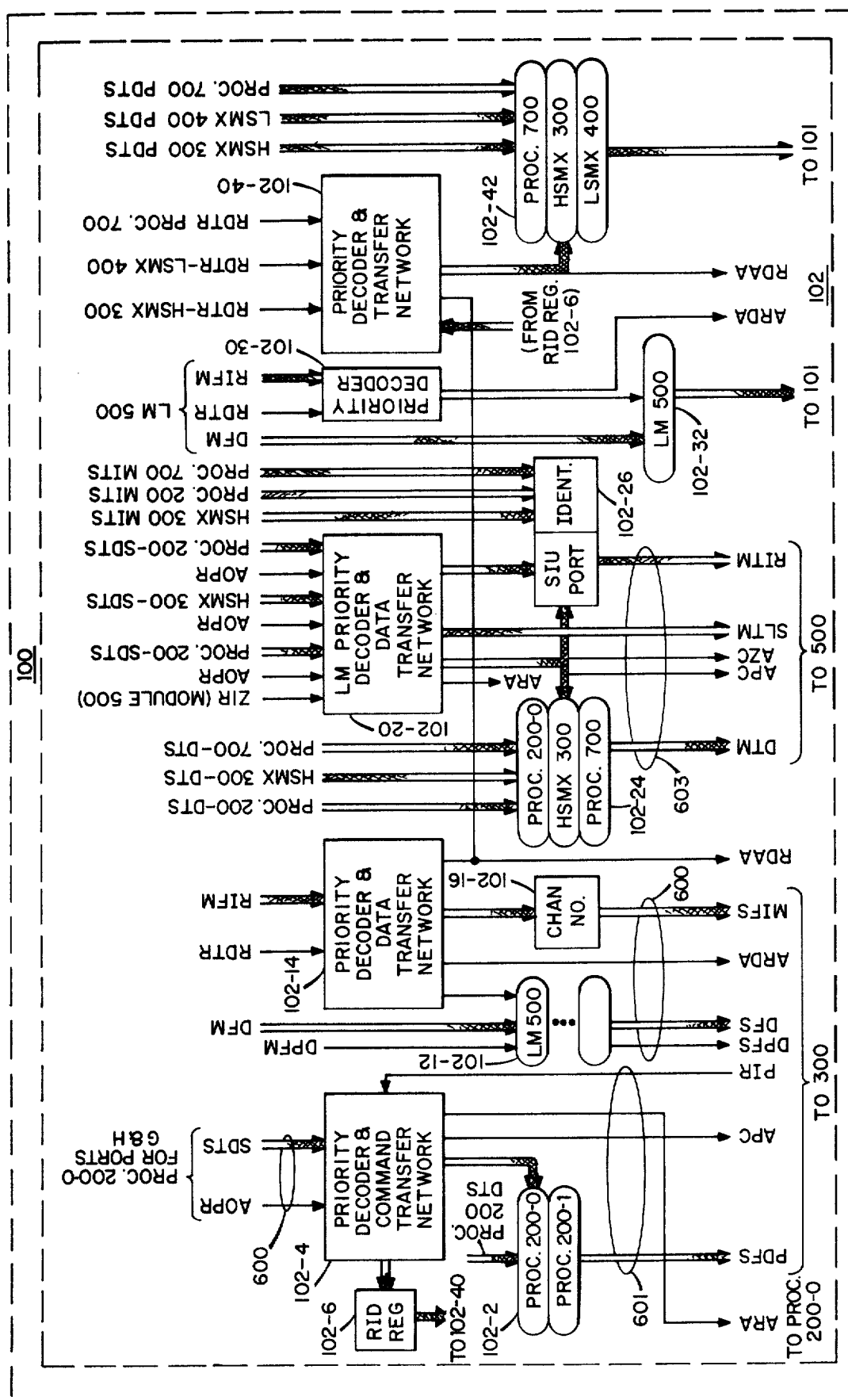

FIG. 3b shows the data transfer section 102 of the system interface unit 100. This section includes priority circuits which establishes which source module is to transfer commands to the high speed multiplexer 300 on its programmable interface 601 and which source module is to transfer data to the multiplexer 300 on its data interface 600. Additionally, section 102 includes priority circuits which determine which source module is going to transfer either data or commands to local memory module 500.

It will be appreciated that transfers between a pair of modules occurs when one module has generated a request to the other module and that the request has been accepted by the other module. In order for a request to be accepted, the requesting module must have the highest priority, both modules must be in a state to receive information and that the transfer path over which the transfer is to take place must be available (i.e. not busy).

As concerns the signals applied to section 102 by processor 200, the generation of these signals is to a large extent controlled by the different fields of the microinstructions read out into processor register 201-15 of FIG. 2. For example, the active output port request (AOPR) line from processor 200 applied to the circuits of block 102-4-is enabled in accordance with a SIU request type control bit field of each microinstruction read out to register 201-15 which is coded to define a transfer of a read/write memory or programmable interface command. The data to SIU lines (DTS) of the processor data interface 600 applied to a two position data selector switch 102-2 constitute command information generated under microprogram control which is loaded into the processor data output register 204-14 of FIG. 2. The steering data to SIU (SDTS) lines receive signals generated under microprogram control which are loaded into the processor steering register 204-16 of FIG. 2.

For the system of FIG. 1, only I/O processors transfer commands to the multiplexer 500 only and processor 200 applies signals to network 102-4. The network 102-4 therefore includes decoder circuits which decode the steering information from the processor module to establish when the module desire to transfer commands to the multiplexer 300. In the case of more than one I/O processor when more than one module desires to transfer during the same cycle, a priority network included in network 102-4 selects the module assigned the highest priority and enables the transfer of a command by that module to the multiplexer 300 on the PDFS lines of its programmable interface 601. For further information regarding interrupt section 101, reference may be made to U.S. Pat. No. 4,000,487, which issued on Dec. 28, 1976.

DESCRIPTION OF OPERATION

The operation of the system of the present invention will now be described with reference to FIGS. 1 through 9. As seen from FIG. 8, the local memory module 500 is capable of carrying out a number of different types of ZAC commands. Briefly, the module 500 is capable of processing 5 different types of ZAC commands which are defined as follows:

1. Read Single — the contents (one word) of the addressed memory location are read and transmitted to the requester. Memory contents are not altered. ZAC bit 9 defines whether cache is to be loaded or bypassed. However, if that block is already loaded in the cache, the read cycle is done in the cache and the information is taken from cache.
2. Read-Clear Single — the contents (one word) of the addressed memory location are read and transmitted to the requester and the memory location (one word) is cleared to zeros with good parity (or EDAC) bits. The data block containing the addressed word is not loaded into the cache. If that block is already loaded in the cache, the addressed word is also cleared to zeros in the cache.
3. Read Double — the contents of the addressed pair of memory locations (two words) are read and transmitted to the requester word serially. Memory contents are not altered. ZAC bit 9 defines whether cache is to be loaded or bypassed. However, if that block is already loaded in the cache, the read cycle is done in the cache and the information is taken from cache.
4. Write Single — one to four bytes of the data word supplied by the requester are stored in the addressed memory location. The bytes to be stored are specified with the zone bits. Zone bits 5, 6, 7 and 8 control bytes 0, 1, 2 and 3 respectively. The memory contents of byte positions that are not to be stored remain unaltered.
5. Write Double — the two data words supplied by the requester are stored in the addressed pair of memory locations.

The specific codes for the different ZAC commands are as follows. The other possible eleven codes are defined as being illegal and produce an error signal as explained herein.

| CMD | | | | ZONE | | | | Cache Bypass Bit | |
|---|---|---|---|---|---|---|---|---|---|
| 1 | 2 | 3 | 4 | 5 | 6 | 7 | 8 | 9 | |
| 0 | 0 | 0 | 0 | 0 | 0 | 0 | 0 | 1/0 | Read Single |
| 0 | 0 | 1 | 0 | 0 | 0 | 0 | 0 | — | Read Clear Single |
| 0 | 1 | 0 | 0 | 0 | 0 | 0 | 0 | 1/0 | Read Double |
| 1 | 0 | 0 | 0 | 1/0 | 1/0 | 1/0 | 1/0 | — | Write Single (Zoned) |
| 1 | 1 | 0 | 0 | 1 | 1 | 1 | 1 | — | Write Double |

By way of example, it is first assumed that one of the processors 200 of pair P0 is operative to begin execution of a series of program instructions specifying the referencing of local memory module 500. In this example, the first and successive instructions are formatted to include at least one field specifying a general register which stores an index value and another field including an address syllable. The general register index value contents defines the state of bypass bit 9 which is assumed to have been set to a binary ZERO. The processor 200 combines the information to produce an absolute address.

Once the absolute address has been calculated, the processor 200 generates the required memory command word and appropriate SIU steering information for directing the command to local memory module 500. The steering and command have the formats shown in FIG. 8.

Considering the above in greater detail, the op code of each instruction is coded to specify a memory reference operation performed by the generation of a ZAC command. The op code of the first instruction is applied by instruction register switch 202-4 to memory 201-2 which causes the memory to reference one of the locations. The contents of the location are read out into register 201-4 and include a pair of addresses specifying the storing addresses in control store 201-10 of the microinstruction sequences required for instruction processing.

During a first phase of instruction processing which begins during the execution of a current instruction, the index bits of the next instruction are used to address a specified one of the general register locations of scratch pad memory 203-10 via position 3 of switch 203-14 (i.e., Lev, XR1). The contents of the location are read out to buffer 203-16.

The contents of the index register are applied via position 0 of switch 203-20 to the A operand input of adder 204-2 which the displacement field of the instruction is applied via position 0 of switch 204-1 to the B operand input of adder 204-2. The two are added together and the result is transferred to working register R2 via switch 204-8. When there is a second level of index specified, a similar operation is performed which adds the value stored in the second general register location to the previously stored result in register R2. It will be readily appreciated that the appropriate value for bit 9 could have been stored in the second general register rather than in the first general register.

During the execution phase of the instruction, the processor 200 operates to generate a ZAC command to local memory 500 specifying a read operation and apply the appropriate memory address obtained from either memory 204-4 or R2 register. Assuming an absolute address, the address from register R2 is applied to the WRP bus and loaded into the data out register 204-14 via the R/W position of address switch 204-6 and cross bar switch 204-8.

The steering switch 204-10 provides the SIU steering for the memory cycle of operation. The signals have the format of FIG. 9 and provide information for use by SIU 100 for transferring the R/W command to local memory module 500 or to port LM0 to which the module 500 connects. They are loaded under microprogram control from register 201-15 and from address switch 204-6 via the R/W position of steering switch 204-10 into bit positions 0-8 of steering register 204-16.

For further information regarding the coding of microinstruction fields and the generation of steering information, reference may be made to the copending application "Memory Access System."

Following the loading of both registers 204-4 and 204-16, the processor 200 forces the AOPR line to a binary ONE which begins the signal sequence for transfer of the R/W command to local memory module 500. Also, the processor 200 increments the instruction counter (IC) and stores the result in working register R3. Then the processor 200 delays execution of the next microinstruction until it receives a signal via the ARA line from the SIU 100 indicating the acceptance of the request.

The SIU 100 views the R/W command as requiring a pair of SIU cycles, an address/command cycle followed by a data cycle. Assuming that the local memory module 500 is ready to accept the command, the ZIR line is a binary ONE (in FIG. 9 the waveforms are shown in terms of negative logic signals). The SIU priority network 102-4 of FIG. 3b is operative to apply the command word via a SIU selector switch to the DTM lines of the local memory interface 602 during a cycle of operation. The processor 200 waits holding the information in the data out register 204-14 until the SIU 100 forces the ARA line to a binary ONE. Simultaneously, the SIU 100 switches the AZC line to a binary ONE signalling the module 500 to accept the R/W command (see FIG. 11).

Upon detecting the change of state in the ARA line, the processor 200 under microinstruction control completes the processing of the instruction. That is, the processor 200 waits until the data word(s) requested has been received from SIU 100 as explained herein.

Here it is assumed that the memory command is coded to specify a read single operation with bypass bit 9 coded to specify that cache 500-20 not be bypassed but be loaded (i.e., bit 9 = 0). As discussed above, the state of bit 9 controls the loading of cache 500-20 in the case of read single and read double commands.

Figure 8:
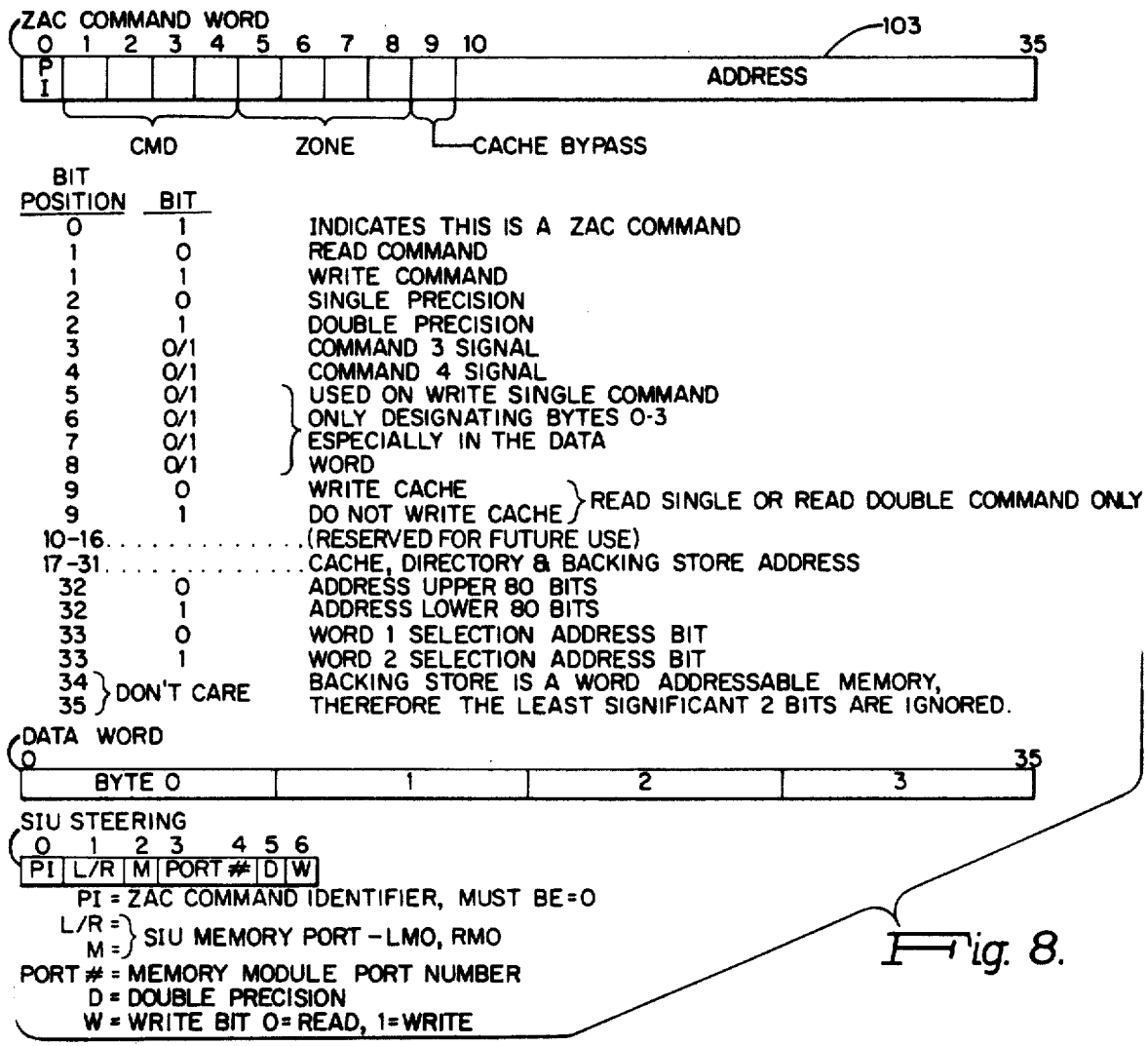
FIG. 8 shows the format of a ZAC memory command in accordance with the present invention.
Figure 9:
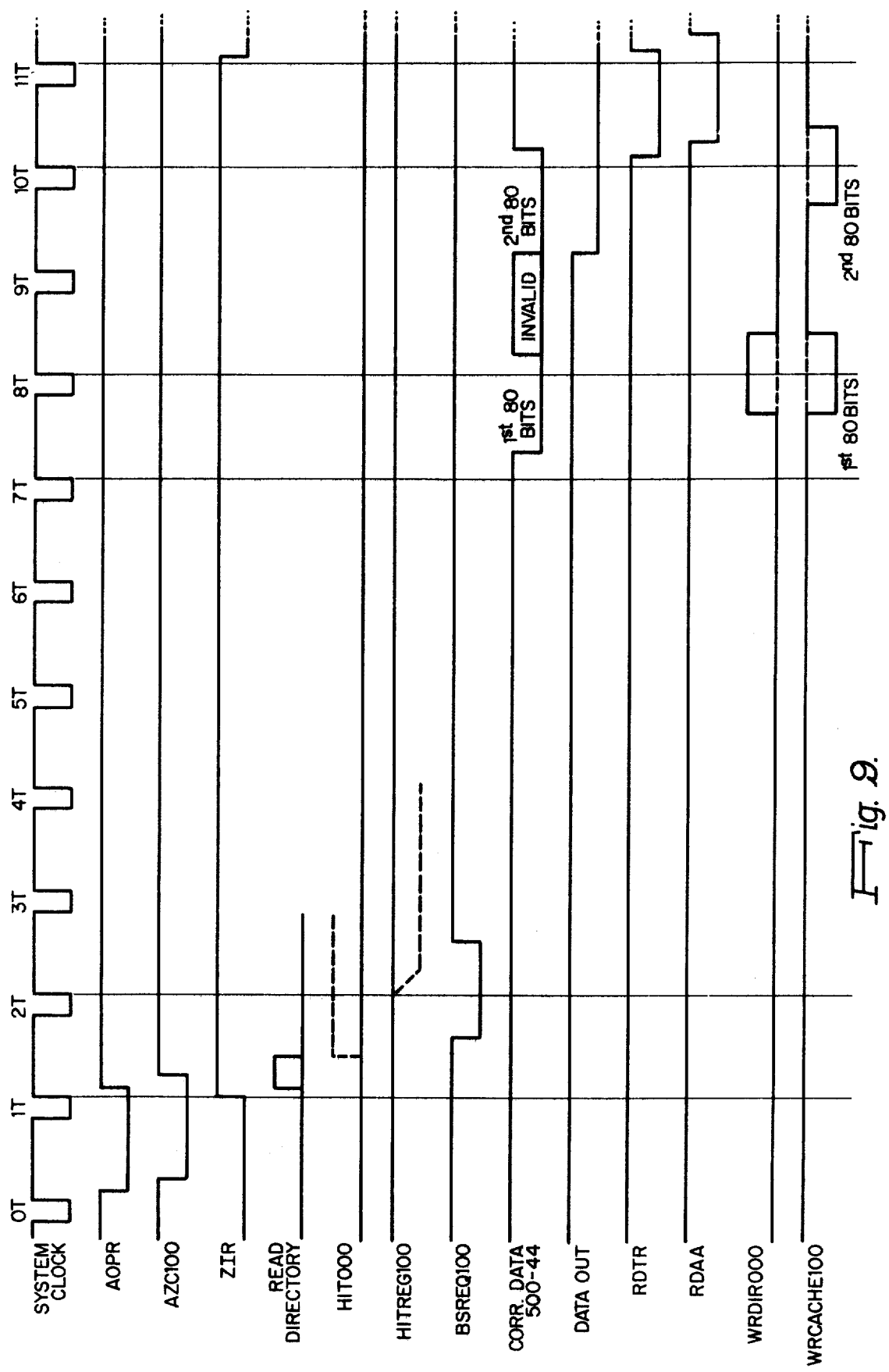
FIG. 9 is a timing diagram used in explaining the operation of the present invention.

Referring to FIGS. 9 and 8, it is seen that the command and address data of the ZAC command word are loaded into ZAC register 500-120 in response to signal AZC100 from the AZC line at time 1T (i.e., trailing edge when system clock pulse 1T switches from a binary ONE to a binary ZERO). The address signals from the DTM lines 17-33 stored in ZAC register 500-120 are applied as inputs to the directory storage unit 500-22 and to the directory comparison logic circuits 500-24 as shown in FIG. 7.

More specifically, the address signals applied to DTM lines 26-32 are used as a block address for addressing the directory storage unit 500-22 while the address signals applied to lines DTM 17-25 correspond to the signals to be written into directory storage unit 500-22 in the case of a directory write operation. The same address signals applied to the directory comparison circuits 500-24 are used for establishing whether the block of data already resides in cache 500-20.

It will be also noted that the address signals applied to lines DTM 17-33 are also applied to backing store 500-40 for read out of a block of data therefrom when the data is not found to reside in cache 500-20.

From FIG. 9, it is seen that a search of the directory storage unit 500-22 is immediately initiated to determine if the information requested has already been stored in cache store 500-20. The search operation is performed during the interval between clock pulses 1T and 2T. In this example, it is assumed that the information requested by processor 200 resides in cache 500-20.

Referring to FIG. 7a, it is seen that the circuits of block 500-6 decode bits 1-4 and 9 of the ZAC command. Since bits 1-4 and 9 are all binary ZEROS, signals RCL000 and WR000 are both binary ONES. Hence, gate 500-61 forces signal RR100 to a binary ONE indicating the presence of a read command. This signal is applied as an input to gates 500-62 and 500-460.

It will be noted that the NOLOAD000 signal applied to gate 500-62, representative of the complement of the state of bypass bit 9, is a binary ONE. That is, it is assumed that there were no errors in transferring the command/data from one section of the memory module to another (i.e., no bus parity errors) and that the command is valid, etc. Also, it is assumed that there were no multiple level comparisons or other errors detected by the OR gate 500-338 resulting in a directory error. Hence, the signal LME/DE000 is a binary ONE as a consequence of no local memory error and no directory error.

It is seen from FIG. 9 that in this example, it is assumed that the information being requested is in cache store 500-20. Accordingly, from FIG. 7a, gate 500-282 is normally operative to force signal SETHIT100 to a binary ONE which switches hit register flip-flop 500-284 to a binary ONE. However, in the present example, it is assumed that a portion of the information being read from cache store 500-20 is incorrect.

As seen from FIG. 7c, the above causes one of the parity generator circuits 500-300 through 500-306 to switch the signal at its odd output terminal to a binary ZERO. As seen from FIG. 7a, this causes gate 500-285 to switch signal DIR/CERR000 to a binary ZERO inhibiting flip-flop 500-284 from being switched to a binary ONE. Additionally, the cache error signal causes NOR gate 500-287 to force signal INHIBRR000 to a binary ZERO. This, in turn, inhibits AND gate 500-289 from advancing modifying the directory address for writing the information read out from backing store 500-40 into the next directory level.

Because of the occurrence of the cache error condition, signals HIT000 and HIT100 correspond to a binary ONE and a binary ZERO respectively. That is, a no hit condition or miss condition has been simulated.

Backing store timing signal BST8000 is a binary ZERO during timing pulse T8 which causes gate 500-68 to force signal RDLDT100 to a binary ONE. Accordingly, gate 500-62 forces signal RDLOAD100 to a binary ONE.

The signals RR100 and HIT000 condition gate 500-460 to force the read and miss signal RD/MISS000 to a binary ZERO. This causes gate 500-462 to force the backing store command signal BSCMD100 to a binary ONE. Assuming the read command is valid (i.e., correct code and format), signal TCERROR000 is a binary ONE. Accordingly, upon the occurrence of backing store timing signal SLO4T/NSLO2T100, gate 500-464 is operative to force the backing store request signal BSREQ100 to a binary ONE during the interval between timing pulses 1T and 2T (see FIG. 9). This signals the backing store 500-40 to initiate a memory cycle of operation.

In response to such request, the backing store 500-40 is operative to read out a 160 bits of data into output register 500-42. The data appears in correct form at the output of the circuits 500-44 prior to the occurrence of timing pulse T7 as shown in FIG. 9. That is, the EDAC circuits 500-44 of FIG. 7d are operative to ensure that a correct version of the requested data appears at the output of circuits 500-450.

Upon the occurrence of backing store timing signal BS8T101 from clock circuits 500-48, signal RDLOAD100 causes gate 500-260 to force write directory signal WRDIR000 to a binary ZERO. This in turn causes gate 500-262 to force enable directory write signal ENABDIRWR100 to a binary ONE when the directory clear signal DRCLR000 is a binary ONE. This signal is a binary ONE except when the director storage unit 500-22 is being cleared (see U.S. Pat. No. 3,845,474 regarding clearing operations).

The gate 500-264 forces the write directory signal WRDIR100 to a binary ONE upon the occurrence of directory clocking signal CLKDIR100 as seen from FIG. 9.

The signal WRDIR100 enables the directory write gating circuits 500-266 to apply appropriate timing signals to the circuits of each directory level. This enables the address signals and parity bit signal DIRDAPARITY100 generated by circuit 500-23 applied to the directory storage unit 500-22 to be written into the signal level at the location specified by the address signals applied via lines DTM 26-31.

It will be noted from FIG. 9 that during the same time interval that the first 80 bits of correct data read out from backing store 500-40 are written into cache 500-20. More specifically, the cache write enable circuits 500-214 are conditioned by the write cache signal WRCACHE100 during timing pulses 8T and 10T as seen from FIG. 9. That is, signal MISS100 is a binary ONE as a consequence of the simulated "miss" condition. Timing signal BST10101 from backing store circuits 500-46 is a binary ONE during timing pulse T10. Accordingly, gate 500-68 forces signal RDLDT100 to a binary ONE during timing pulse T8 when backing store signal T8000 is a binary ZERO and during timing pulse T10 when signal LDSCND80000 is a binary ZERO.

Gate 500-62 forces signal RDLOAD100 to a binary ONE which in turn causes gate 500-74 to force signal RDLOADT000 to a binary ZERO. Accordingly, gate 500-210 forces write cache signal WRCACHE100 to a binary ONE during the time intervals 8T and 10T. Thus, gate 500-210 is operative to force the write cache signal WRCACHE100 to a binary ONE upon the occurrence of cache timing signal CLK141 as seen from FIG. 9. It will be noted that since this is a read command, signal WRLOAD000 can be disregarded (i.e., a binary ONE).

Similar to the write directory signal WRDIR100, the write cache signal WRCACHE100 conditions the cache write enable circuits 500-214 to generate timing signals which are applied to the various cache sections.

During timing pulse T8, the first 80 bits corresponding to signals RD00-RD71 and RDP0-P7 are applied via input switch 500-8 and written into the column specified by the address signals applied to lines DTM 26-31. At this time, address bit 32 is a binary ZERO. Before timing pulse T10, address bit 32 is complemented and during timing pulse T10 the upper 80 bits contained in register 500-42 are applied via switch 500-8 and written into cache 500-20. The state of address bit 32 is manipulated by the circuits 500-216 through 500-222 so as to enable the entire 160 bits corresponding to a block of data to be written into cache 500-20.

This is accomplished by the complementing of the lower 80 bit signal LWR80100 from backing store control circuits 500-46. More specifically, when signal LWR80100 is a binary ONE (writing lower 80 bits), gate 500-218 forces signal RDLDU80000 to a binary ONE. The gate 500-222 causes address signal CAADDR32100 to assume the state address signal stored in ZAC register 500-120. That is, when address bit 32 is a binary ONE, signal CAADDR32100 is a binary ONE. However, when signal LWR80100 is forced to a binary ZERO (writing upper 80 bits), signal RDLDU80000 is forced to a binary ZERO. Here, address signal CAADDR32100 is forced to a binary ZERO.

The data is applied as an input to output switch 500-10. The output switch 500-10 is enabled by the enable signal ENABBSDATA100 which is forced to a binary ONE by gate 500-468 in response to signals HITREG000 and BSRD100. Additionally, the circuits 500-6 apply appropriate select signals to switch 500-10 for determining which word of the 160 bits is to be transferred to processor 200. The select signals are derived by detecting address signals 32 and 33 stored in ZAC register 500-120. The data is applied to the DFM lines during timing pulse T10 as shown in FIG. 9.

The local memory module 500 is operative to force line RDTR to a binary ONE signalling the SIU 100 that the data previously requested by a ZAC command is available when the processor 200 has accepted the data following the establishment of a data path signalled by ARDA forced to a binary ONE, SIU 100 forces the RDAA line to a binary ONE. This signals the local memory module 500 that the data has been accepted and that it may remove the data from the DFM lines.

It will be noted from FIG. 9 that as the requested correct version of the data is being forwarded to processor 200, a block of data identified by the request is also being written into cache 500-40 at the same level as from which it was read out (i.e., bypass bit 9 is set to a binary ZERO). This arrangement enables the correction of cache errors produced by transit error conditions as well as intermittent error conditions.

As seen from FIG. 9, the entire 160 bits are written into cache 500-20 prior to the beginning of a next memory cycle of operation.

It will be appreciated that in the case of a directory error, one of the circuits 500-330 through 500-336 is operative to force its output to a state indicative of an error. This in turn causes NOR gate 500-338 to force signal DIRERR000 to a binary ZERO. From FIG. 7a, it is seen that this causes AND gate 500-285 to force signal DIR/CERR000 to a binary ZERO inhibiting hit register flip-flop 500-284 from being switched to a binary ONE. This is effective to simulate a "miss" condition as discussed previously. However, signal DIRERR000 also inhibits gate 500-66 from switching to a binary ONE. Thus, this inhibits the control circuits 500-6 from writing the correct version of the requested information into cache store 500-20. The reason is that since a directory error has been detected, this means that the directory address information is incorrect which would cause selection of data from the wrong location. Hence, no information is written into the directory storage unit 500-22 and cache store 500-20 in this instance.

It will be noted from FIG. 7c that the occurrence of either a cache error or a directory error causes one of the flip-flops of register 500-320 to be switched to a binary ONE. This in turn causes the parity error circuit 500-322 to force signal CESPAR100 to a binary ONE. The signal CESPAR100 is used to set a status bit in a register not shown for designating the detection of a cache error to the system's input/output processing unit. The operating system periodically monitors the state of the status bit for detecting the reason for any decrease in system performance prompted by cache errors (i.e., hit ratio in cache decreased).

From the above it is seen how the cache memory system of the present invention is able to provide for reliable operation without requiring sophisticated and complex error detection and correction circuits. It accomplishes this by simulating the presence of a "miss" condition and enabling a correct version of the information to be read out from backing store which includes sophisticated EDAC circuits. Additionally, the cache memory system is able to provide for automatic correction of bad cache information by writing back into cache store a correct version of the information read out from backing store when the command enables same.

It will be appreciated that many modifications may be made to the preferred embodiment of the present invention as for example, the manner in which commands are formatted and coded as well as the manner in which certain control and timing signals are generated. For the sake of simplicity, in many instances, a single source of the various signals was indicated. However, it will be appreciated that the same signals may be independently generated by other sources for reducing timing restrictions.

While in accordance with the provisions and statutes there has been illustrated and described the best forms of the invention known, certain changes may be made to the system described without departing from the spirit of the invention as set forth in the appended claims and, in some cases, certain features of the invention may be used to advantage without a corresponding use of other features.

What is claimed is:

1. A memory system comprising:
    a backing store for storing information words, said backing store including a plurality of word locations, each number of said plurality of word locations defining a block of word locations;
    error detection and correction circuit means operatively connected to said backing store for detecting and correcting errors in the words read out from said backing store during a backing store cycle of operation;
    a cache store for storing blocks of information words, said cache store having a plurality of word locations, each number of said plurality of word locations defining a block of word locations;
    cache error detection means operatively connected to said cache store, said error detection means being operative to generate an error signal upon detection of an error in a block of information words read out from said cache store during a cache cycle of operation;
    a directory store including a plurality of word locations corresponding in number to the number of blocks in said cache store, each word location for storing a block address designating where a particular block of information is stored in said cache store;
    directory error detection means operatively connected to said directory store, said error detection means being operative to generate an error signal upon detection of the occurrence of an error condition in said directory store during said cache cycle of operation;
    control means operatively connected to said cache store, to said directory store and to said backing store, said control means for controlling the operation of said cache store, said directory store and said backing store, said control means including:
    input register means connected to receive read memory commands, each coded to include an address specifying which ones of said word locations are to be referenced; and,
    command decode circuit means connected to said input register means for decoding said memory commands, said decode circuit means in response to each read command being operative to generate control signals for selectively enabling said directory store, said backing store and said cache store for read out of a block address and said information words specified by said read command;
    comparison means connected to said directory store and to said input register means for comparing said address to said memory command with said block address read out from said directory store in response to said memory command and for generating an output compare signal indicative of an address comparison; and,
    hit control means for generating a hit signal in response to said output compare signal for indicating when the information words specified to be fetched by said read command are stored in said cache store, said hit control means being coupled to said comparison means, said cache error detection means and said directory error detection means, said hit control means being conditioned by the occurrence of any one of said error signals for generating said hit signal in response to said compare signal to simulate a condition which is opposite to that represented by said hit signal thereby enabling a correct version of said information words to be fetched from said backing store.

2. The system of claim 1 wherein said control means further includes backing store request circuit means coupled to said command decode circuit means and to said hit control means, said request circuit means being conditioned by said command decode circuit means and said hit control means to generate a request signal for conditioning said backing store to read out said correct version of the information words specified by said read command during said backing store cycle of operation concurrent with said cache cycle of operation in which said error signal is generated.

3. The system of claim 2 wherein said hit control means includes bistable storage means having input gating means connected to receive said output compare signal and said error signals from said directory and cache error detection means, said input gating means being selectively conditioned by said error signals to switch said bistable storage means from a first state to a second state in response to said output compare signal.

4. The system of claim 3 wherein said first and second states correspond to a binary ZERO and binary ONE respectively, said binary ONE being representative of said hit signal.

5. The system of claim 2 wherein said block of said backing store word locations is arranged to store error detection and correcting codes generated to the information words of said block when written into said backing store, said error detection and correction circuit means being operative in response to said error checking codes and information words read out from said backing store during said backing store cycle of operation to locate and correct any errors in said information words, and wherein said cache store word locations are arranged to store parity check bits for checking the correctness of said information words read from said cache store, said error detection means including cache parity generation circuit means connected to receive signals representative of an information word and said parity check bits read from said cache store, said parity generation circuit means being operative to generate said error signal when said check bits indicate that said information word is in error.

6. The system of claim 5 wherein each information word includes a number of bytes and a corresponding number of parity check bits, said cache parity generation circuit means including a plurality of parity generation circuits equal in number to said number of bytes and said cache store further including output selection means coupled to said command decode circuit means, said comparison means and to said cache parity generation circuit means, said output selection means being operative to apply to each of said parity generation circuits, signals representative of a different one of said bytes and a parity check bit, said each parity generation circuit being operative to generate said error signal when said parity check bit indicates that said byte is in error.

7. The system of claim 2 wherein each of said directory store locations is arranged to store a parity check bit for checking the correctness of the block addresses read from each of said locations, said error detection means including directory parity check circuit means connected to receive signals corresponding to each block address including said parity check bit read from said directory store and said parity check circuit means being operative to generate an error signal indicating when said block address is incorrect.

8. The system of claim 7 wherein said directory store includes a plurality of storage levels, each for storing a block address designating where in said cache store a particular block of information is stored;

said comparison means including a plurality of comparator circuits equal in number to said plurality of levels, each comparator circuit for comparing said read command address with the block address read out from a different one of said plurality of storage levels and for generating an output signal indicating the presence of a true comparison; and, said error checking means further including multiple detector gating means coupled to each of said comparator circuits, said detector gating means being conditioned by the presence of said output signal from at least a pair of said plurality of said comparator circuits to generate said error signal for simulating said condition.

9. The system of claim 8 wherein said directory parity check circuit means includes:

a plurality of parity generator circuits equal in number to said plurality of levels, each of said plurality of parity generator circuits being connected to receive the block address read out from a different one of said plurality of storage levels and generate a parity bit signal for said block address; and, a plurality of summing circuits equal in number to said plurality of levels, each of said summing circuits being connected to receive said parity bit signal from a different one of said plurality of parity generator circuits and said parity check signal read out from a different one of said storage levels, said each summing circuit being operative upon detection of a non-comparison between said parity signals to generate said error signal.

10. The system of claim 2 wherein each read command includes a predetermined bit for selectively bypassing the storage of information in said cache store specified by said each read command, said bit when in a predetermined state conditioning said command decode circuit means to generate control signals for writing said correct version of said information words read out from said backing store into said cache store and said hit register means further including gating means connected to said cache error detection means and to said directory store, said gating means in response to said error signal conditioning said directory store to enable writing of said correct version of said information words into the block of word locations specified by said block address referenced by said memory command address for correction of transit error conditions.

11. For use in an input/output system including a plurality of command modules, each including command generating means for generating memory commands, a memory system connected in common with said plurality of command modules comprising:

a backing store including a plurality of word locations for storing information words, said backing store further including error detection and correction circuit means operatively connected for reliably detecting and correcting errors in the information words read out from said backing store during a backing store cycle of operation;

a cache store including a plurality of word locations for storing blocks of information words, said cache store further including cache error detection means operatively connected to generate an error signal upon detection of an error in a block of information words read out from said cache store during a cache cycle of operation;

a directory store including a plurality of word locations corresponding in number to the number of blocks in said cache store, each word location for storing a block address designating where a particular block of information is stored, said directory store further including directory error detection means operatively connected to generate an error signal upon the detection of an error condition in said directory store occurring during said cache cycle of operation;

control means operatively connected to said cache store, said directory store and to said backing store, said control means for initiating a memory cycle of operation involving concurrent cycles of operation in said cache store, said directory store and said backing store, said control means including:

input register means connected to receive said memory commands, each coded to include an address specifying which ones of said word locations are to be referenced during a memory cycle of operation; and, command decode circuit means connected to said input register means for decoding said memory commands, said decode circuit means in response to each read command being operative to generate control signals for selectively enabling said directory store, said backing store and said cache store for read out of a block address and said information words specified by said read command;

comparison means connected to said directory store and to said input register means for comparing said address of said memory command with said block address read out from said directory store in response to said memory command and for generating an output compare signal indicative of an address comparison; and, hit control means for generating a hit signal in response to said output compare signal indicating when the information words specified to be fetched by said read command are stored in said cache store, said hit control means being coupled to said comparison means, said cache error detection means and said directory error detection means, said hit control means being conditioned by the occurrence of any one of said error signals from generating said hit signal in response to said compare signal to simulate a miss condition enabling a correct version of said information words specified to be fetched from said backing store during said memory cycle of operation.

12. The system of claim 11 wherein said control means further includes backing store request circuit means coupled to said command decode circuit means and to said hit register means, said request circuit means being conditioned by said command decode circuit means and said hit control means to generate a request signal for conditioning said backing store to read out said correct version of the information words specified by said read command during said memory cycle of operation.

13. The system of claim 12 wherein said hit control means includes bistable storage means having input gating means connected to receive said output compare signal and said error signals from said directory and cache error detection means, said input gating means being selectively conditioned by said error signals to switch said bistable storage means from a first state to a second state in response to said output compare signal.

14. The system of claim 13 wherein said first and second states correspond to a binary ZERO and binary ONE respectively, said binary ONE being representative of said hit signal.

15. The system of claim 12 wherein each block of said backing store word locations is arranged to store error detection and correcting codes (EDAC) generated for the information words of said block when written into said backing store, said error detection and correction circuit means being operative in response to said EDAC codes and information words read out from said backing store during said backing store cycle of operation to locate and correct any errors in said information words, and wherein said cache store word locations are arranged to store parity check bits for checking the correctness of said information words read from said cache store, said error detection means including cache parity generation circuit means connected to receive signals representative of an information word and said parity check bits read from said cache store, said parity generation circuit means being operative to generate said error signal when said check bits indicate that said information word is in error.

16. The system of claim 15 wherein each information word includes a number of bytes and a corresponding number of parity check bits, said cache parity generation circuit means including a plurality of parity generation circuits equal in number to said number of bytes and said cache store further including output selection means coupled to said command decode circuit means, said comparison means and to said cache parity generation circuit means, said output selection means being operative to apply to each of said parity generation circuits, signals representative of a different one of said bytes and a parity check bit, said each parity generation circuit being operative to generate said error signal when said parity check bit indicates that said byte is in error.

17. The system of claim 12 wherein each of said directory store locations is arranged to store a parity check bit for checking the correctness of the block addresses read from each of said locations, said error detection means including directory parity check circuit means connected to receive signals corresponding to each block address including said parity check bit read from said directory store and said parity check circuit means being operative to generate an error signal indicating when said block address is incorrect.

18. The system of claim 17 wherein said directory store includes a plurality of storage levels, each for storing a block address designating where in said cache store a particular block of information is stored;

said comparison means including a plurality of comparator circuits equal in number to said plurality of levels, each comparator circuit for comparing said read command address with the block address read out from a different one of said plurality of storage levels and for generating an output signal indicating the presence of a true comparison; and, said error checking means further including multiple detector gating means coupled to each of said comparator circuits, said detector gating means being conditioned by the presence of said output signal from at least a pair of said plurality of said comparator circuits to generate said error signal for simulating said miss condition.

19. The system of claim 18 wherein said directory parity check circuit means includes:

a plurality of parity generator circuits equal in number to said plurality of levels, each of said plurality of parity generator circuits being connected to receive the block address read out from a different one of said plurality of storage levels and generate a parity bit signal for said block address; and, a plurality of summing circuits equal in number to said plurality of levels, each of said summing circuits being connected to receive said parity bit signal from a different one of said plurality of parity generator circuits and said parity check signal read out from a different one of said storage levels, said each summing circuit being operative upon detection of a non-comparison between said parity signals to generate said error signal.

20. The system of claim 12 wherein each read command includes a predetermined bit for designating when access to said cache store is to be bypassed during a read operation, said bit when in a predetermined state conditioning said command decode circuit means to generate control signals for writing said correct version of said information words read out from said backing store into said cache store and said hit control means further including gating means connected to said cache error detection means and to said directory store, said gating means in response to said error signal conditioning said directory store to enable writing of said correct version of said information words into the block of word locations specified by said block address referenced by said memory command address for correction of transit error conditions.

21. A memory system comprising:
a backing store system including:
    a backing store having a plurality of word locations for storing information words, and
    error detection and correction circuit means operatively connected for detecting and correcting errors in the information words read out from said backing store during a memory cycle of operation;
a cache store system including:
    a cache store having a plurality of word locations for storing blocks of information words;
    a directory store including a plurality of word locations corresponding in number to the number of blocks of said cache store, each word location for storing a block address designating where a particular block of information is stored; and,
    error checking means connected to generate an error signal upon the detection of an error condition in said cache store system occurring during said cache cycle of operation;
control means operatively connected to said cache store system and to said backing store system, said control means for controlling the operation of said cache store and said backing store, said control means including:
    input register means connected to receive memory commands, each coded to include an address specifying which ones of said word locations are to be referenced during a memory cycle of operation; and,
    command decode circuit means connected to said input register means for decoding said memory commands, said decode circuit means in response to each read command being operative to generate control signals for selectively enabling said directory store, said backing store and said cache store for read out of a block address and said information words specified by said read command;
    comparison means connected to said directory store and to said input register means for comparing said address of said memory command with said block address read out from said directory store in response to said memory command and for generating an output compare signal indicative of an address comparison; and,
    hit control means for generating a hit signal in response to said output compare signal for indicating when the information words specified to be fetched by said read command are stored in said cache store, said hit control means being coupled to said comparison means and said error checking means, said hit control means being conditioned by the occurrence of said error signal from generating said hit signal in response to said compare signal for simulating a miss condition enabling a correct version of said information words specified to be fetched from said backing store system.

22. The system of claim 21 wherein said control means further includes backing store request circuit means coupled to said command decode circuit means and to said hit register means, said request circuit means being conditioned by said command decode circuit means and said hit control means to generate a request signal for conditioning said backing store system to read out said correct version of the information words specified by said read command during said backing store cycle of operation concurrent with said cache cycle of operation in which said error signal is generated.

23. The system of claim 22 wherein said hit control means includes bistable storage means having input gating means connected to receive said output compare signal and said error signal from error detection means, said input gating means being selectively conditioned by said error signal to switch said bistable storage means from a first state to a second state in response to said output compare signal.

24. The system of claim 22 wherein each block of said backing store word locations is arranged to store error detection and correcting codes generated for the information words of said block when written into said backing store, said error detection and correction circuit means being operative in response to said error checking codes and information words read out from said backing store during said backing store cycle of operation to locate and correct any errors in said information words, and
wherein said cache store word locations are arranged to store parity check bits for checking the correctness of said information words read from said cache store, said error detection means including cache parity generation circuit means connected to receive signals representative of an information word and said parity check bits read from said cache store, said parity generation circuit means being operative to generate said error signal when said check bits indicate that said information word is in error.

25. The system of claim 24 wherein each of said directory store locations is arranged to store a parity check bit for checking the correctness of the block addresses read from each of said locations, said error detection means further including directory parity check circuit means connected to receive signals corresponding to each block address including said parity check bit read from said directory store and said parity check circuit means being operative to generate an error signal indicating when said block address is incorrect.

26. The system of claim 25 wherein said directory store includes a plurality of storage levels, each for storing a block address designating where in said cache store a particular block of information is stored;
    said comparison means including a plurality of comparator circuits equal in number to said plurality of levels, each comparator circuit for comparing said read command address with the block address read out from a different one of said plurality of storage levels and for generating an output signal indicating the presence of a true comparison; and,
    said error checking means further including multiple detector gating means coupled to each of said comparator circuits, said detector gating means being conditioned by the presence of said output signal from at least a pair of said plurality of said comparator circuits to generate said error signal for simulating said miss condition.

27. The system of claim 22 wherein each read command includes a predetermined bit for selectively bypassing the storage of information in said cache store specified by said each read command, said bit when in a predetermined state conditioning said command decode circuit means to generate control signals for writing said correct version of said information words read out from said backing store into said cache store and said hit control means further including gating means connected to said error detection means and to said directory store, said gating means in response to said error signal conditioning said directory store to enable writing of said correct version of said information words into the block of word locations specified by said block address referenced by said memory command address for correction of errors caused by transit conditions.

* * * * *